US011335302B2

(12) United States Patent
Rojas

(10) Patent No.: US 11,335,302 B2
(45) Date of Patent: May 17, 2022

(54) ADAPTABLE USER INTERFACE WITH DUAL SCREEN DEVICE

(71) Applicant: GOOGLE LLC, Mountain View, CA (US)

(72) Inventor: Bernardo Núñez Rojas, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1159 days.

(21) Appl. No.: 14/996,346

(22) Filed: Jan. 15, 2016

(65) Prior Publication Data

US 2017/0206861 A1 Jul. 20, 2017

(51) Int. Cl.
*G09G 5/14* (2006.01)
*G06F 1/16* (2006.01)
(Continued)

(52) U.S. Cl.
CPC .............. *G09G 5/14* (2013.01); *G06F 1/1616* (2013.01); *G06F 1/1643* (2013.01);
(Continued)

(58) Field of Classification Search
CPC .................. G06F 3/0416; G06F 3/0488; G06F 2203/04808; G06F 3/041;
(Continued)

(56) References Cited

U.S. PATENT DOCUMENTS

| 9,092,115 B2 | 7/2015 | Harris et al. |
| 2004/0021681 A1* | 2/2004 | Liao ...................... G06F 1/1616 715/702 |

(Continued)

FOREIGN PATENT DOCUMENTS

| CN | 1734392 A | 2/2006 |
| CN | 101470469 A | 7/2009 |

(Continued)

OTHER PUBLICATIONS

International Search Report and Written Opinion for PCT Application No. PCT/US2016/061806, dated Feb. 22, 2017.

(Continued)

*Primary Examiner* — Tadesse Hailu
(74) *Attorney, Agent, or Firm* — Botos Churchill IP Law LLP

(57) ABSTRACT

A dual-screen client device includes a user interface for providing content and application tools to a user in an easy to use manner. Different inputs of the user interface are presented to the user on one or both of the screens depending on a current state of the device and in response to user operation. Content such as an item of interest in a particular application is presented on one screen while tools or other inputs for that application are provided on the other screen. Through user operation of the interface or physical manipulation of the client device, the content and tools are swapped between the dual screens. For instance, buttons and menus can be brought up front to a closer screen for quick input, while active content (e.g., video chat, full image, drawings) is presented on the farther screen.

17 Claims, 37 Drawing Sheets

(51) Int. Cl.

| | |
|---|---|
| *G06F 3/04817* | (2022.01) |
| *G06F 3/0488* | (2022.01) |
| *G06F 3/0482* | (2013.01) |
| *G06F 3/04842* | (2022.01) |
| *G06F 3/04845* | (2022.01) |
| *G06F 3/0485* | (2022.01) |
| *G06F 3/04883* | (2022.01) |

(52) U.S. Cl.
CPC .......... *G06F 1/1647* (2013.01); *G06F 1/1694* (2013.01); *G06F 3/0482* (2013.01); *G06F 3/0485* (2013.01); *G06F 3/0488* (2013.01); *G06F 3/04817* (2013.01); *G06F 3/04842* (2013.01); *G06F 3/04845* (2013.01); *G06F 3/04883* (2013.01); *G06F 2200/1614* (2013.01); *G06F 2200/1637* (2013.01)

(58) Field of Classification Search
CPC ......... G06F 2203/04104; G06F 3/0412; G06F 3/04886; G06F 3/017; G06F 2203/04803; G06F 1/1641; G06F 1/1616; G06F 1/1618; G06F 3/04883; G09G 5/14
See application file for complete search history.

(56) References Cited

U.S. PATENT DOCUMENTS

| | | | |
|---|---|---|---|
| 2006/0026536 A1 | 2/2006 | Hotelling et al. | |
| 2006/0034042 A1* | 2/2006 | Hisano | G06F 1/1616 361/679.04 |
| 2006/0034043 A1* | 2/2006 | Hisano | G06F 1/1616 361/679.04 |
| 2007/0085759 A1 | 4/2007 | Lee et al. | |
| 2007/0182663 A1* | 8/2007 | Biech | G06F 1/1618 345/1.1 |
| 2009/0213081 A1 | 8/2009 | Case, Jr. | |
| 2009/0322690 A1 | 12/2009 | Hiltunen et al. | |
| 2010/0227650 A1 | 9/2010 | Kim et al. | |
| 2011/0210922 A1* | 9/2011 | Griffin | G06F 1/1624 345/173 |
| 2011/0296343 A1 | 12/2011 | Leung et al. | |
| 2012/0081305 A1* | 4/2012 | Schrock | G06F 1/1616 345/173 |
| 2012/0081397 A1* | 4/2012 | de Paz | G06F 1/1616 345/649 |
| 2012/0084701 A1* | 4/2012 | Sirpal | G06F 1/1616 715/773 |
| 2012/0084722 A1 | 4/2012 | Cassar et al. | |
| 2012/0194448 A1* | 8/2012 | Roth | A45C 13/002 345/173 |
| 2012/0243165 A1 | 9/2012 | Chang et al. | |
| 2012/0266098 A1* | 10/2012 | Webber | G06Q 10/107 715/778 |
| 2013/0002595 A1 | 1/2013 | Asagi | |
| 2013/0050265 A1* | 2/2013 | de Paz | G06F 1/1616 345/649 |
| 2013/0076595 A1* | 3/2013 | Sirpal | G06F 3/1438 345/1.3 |
| 2013/0091439 A1* | 4/2013 | Sirpal | G06F 3/1438 715/752 |
| 2013/0321340 A1* | 12/2013 | Seo | G06F 1/1641 345/174 |
| 2014/0101577 A1* | 4/2014 | Kwak | G06F 1/1618 715/761 |
| 2014/0210740 A1* | 7/2014 | Lee | G06F 3/0488 345/173 |
| 2014/0333950 A1* | 11/2014 | Kikuchi | H04N 1/4413 358/1.13 |
| 2015/0338888 A1* | 11/2015 | Kim | G06F 1/1677 345/156 |
| 2017/0090749 A1* | 3/2017 | Marsden | G06F 3/04886 |

FOREIGN PATENT DOCUMENTS

| | | |
|---|---|---|
| CN | 101477442 A | 7/2009 |
| CN | 101827503 A | 9/2010 |
| CN | 102087579 A | 6/2011 |
| CN | 102362248 A | 2/2012 |
| CN | 102812430 A | 12/2012 |
| CN | 103218109 A | 7/2013 |
| CN | 203054674 U | 7/2013 |
| CN | 103238146 A | 8/2013 |
| CN | 103336562 A | 10/2013 |
| CN | 103729159 A | 4/2014 |
| CN | 104937535 A | 9/2015 |
| CN | 105144044 A | 12/2015 |
| CN | 105242869 A | 1/2016 |
| EP | 1775925 A2 | 4/2007 |
| EP | 2565751 A1 | 3/2013 |
| JP | 2006311224 A | 11/2006 |
| JP | 2009005039 A | 1/2009 |
| WO | 2005060544 A2 | 7/2005 |

OTHER PUBLICATIONS

Hinckley K et al., "Codex: A Dual Screen Tablet Computer," Apr. 9, 2009, CHI 2009 New Mobile Interactions, Boston, MA, pp. 1933-1942.
International Preliminary Report on Patentability for PCT Application No. PCT/US2016/061806, dated Jul. 26, 2018. 14 pages.
Examination Report No. 1 for Australian Patent Application No. 2016386036, dated Feb. 18, 2019 4 pages.
Examination Report No. 2 for Australian Patent Application No. 2016386036, dated Feb. 4, 2020, 5 pages.
Extended European Search Report for Application No. 16885398.4 dated Nov. 4, 2019, 15 Pages.
Office Action for Canadian Patent Application No. 3,001,741, dated Dec. 7, 2020.
Office Action for Canadian Patent Application No. 3,001,741, dated Feb. 18, 2020, 6 Pages.
Partial supplementary European Search Report for Application No. 16885398.4, dated Jul. 24, 2019. 19 pages.
The First Office Action for Chinese Patent Application No. 201680059474.0, dated Jun. 24, 2020, 23 Pages.
The Second Office Action for Chinese Patent Application No. 201680059474.0, dated Nov. 3, 2020, 23 Pages.
The Third Office Action for Chinese Patent Application No. 201680059474.0, dated Jun. 2, 2021, 32 Pages.

* cited by examiner

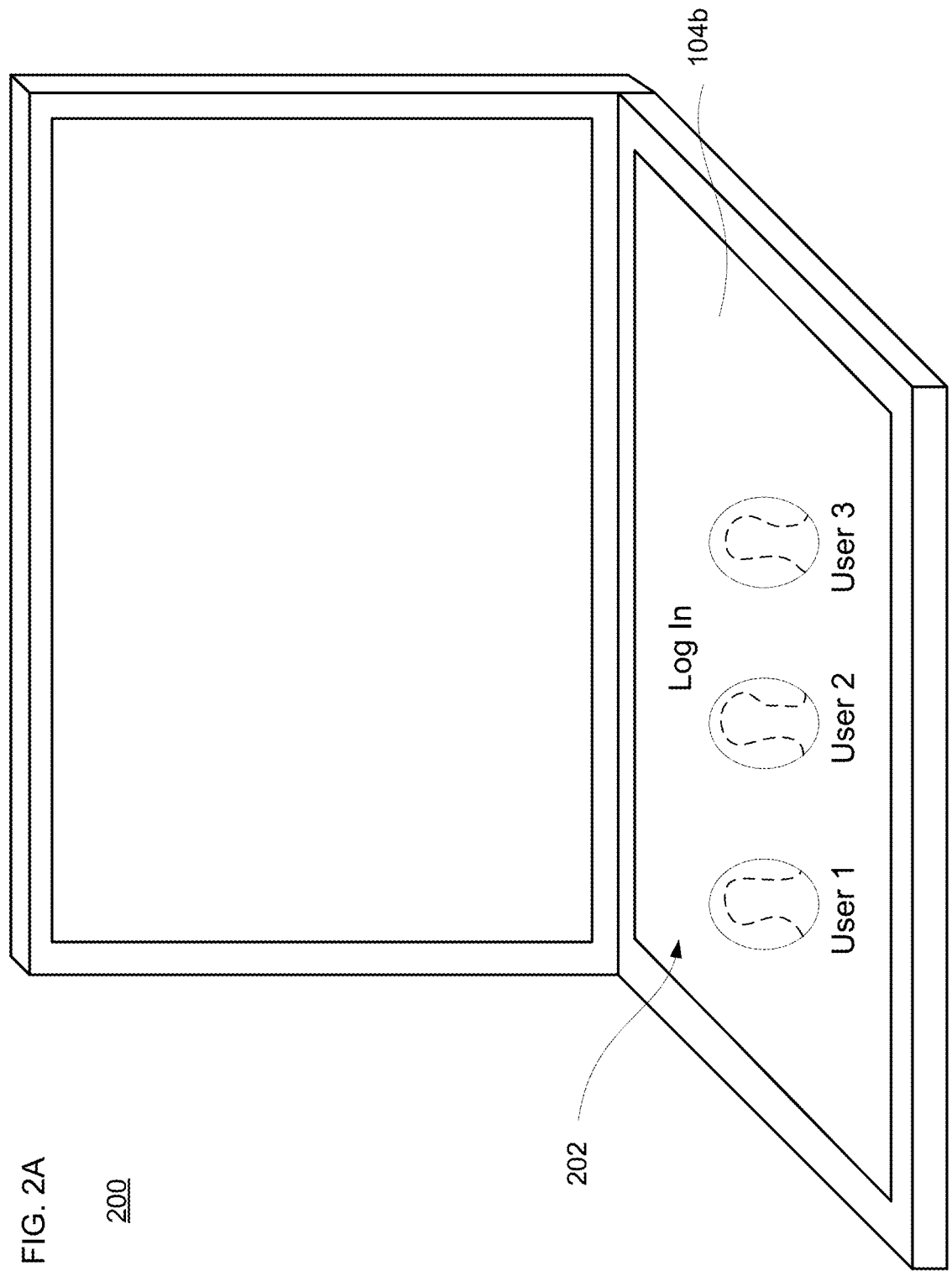

300

500

600

800

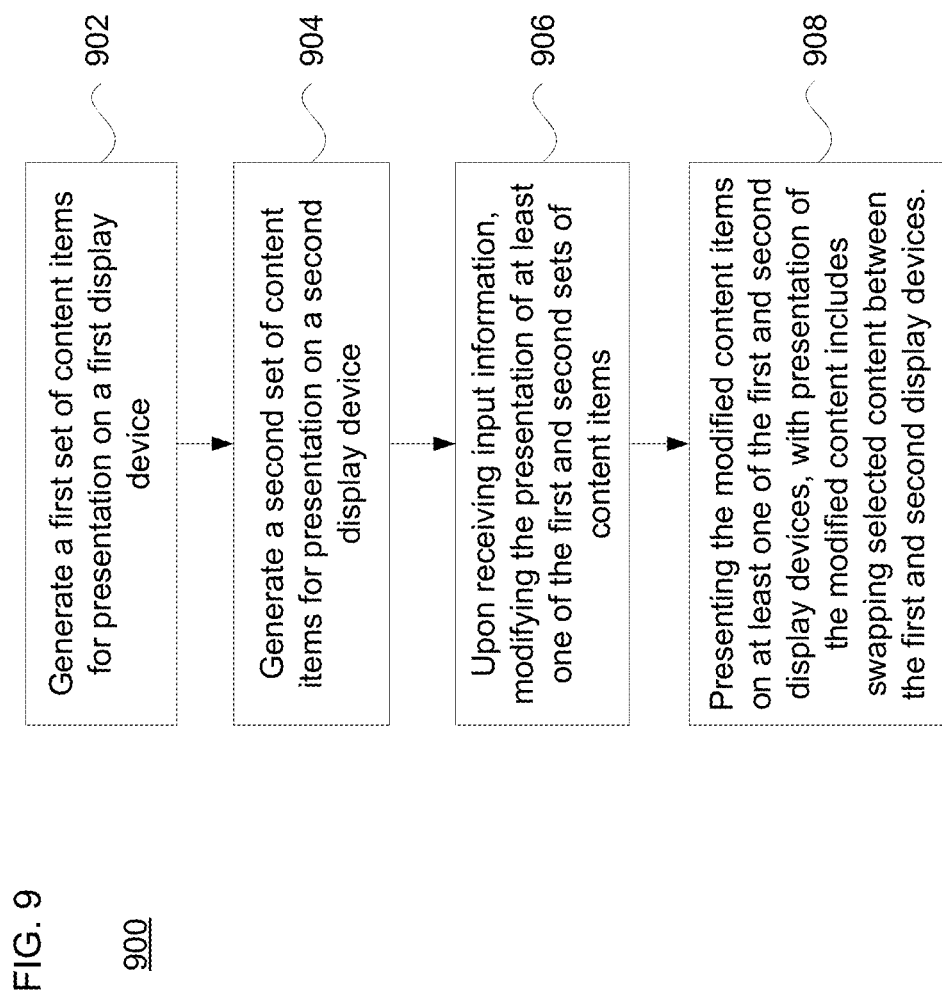

ADAPTABLE USER INTERFACE WITH DUAL SCREEN DEVICE

BACKGROUND

Typical laptops, tablets and similar devices have either a fixed keyboard or a user interface (UI) that presents information in a particular location all the time. For instance, icons, buttons and menu items may always be presented along the bottom of the screen of the device. And while there are some existing dual screen devices, the UIs of both screens are typically separate from one another.

BRIEF SUMMARY

Aspects of the disclosure provide different inputs of the UI are presented to the user on one or both of the screens depending on what the user is doing. This makes applications running on the dual screen device more clear and explicit about the various features, and making it easier to use the applications. For instance, control elements such as buttons and menus can be brought up front to the closer (lower) screen for quick input, while active content (e.g., video chat, full image, drawings) is presented on the farther (upper) screen.

In accordance with aspects of the disclosure, a computer-implemented content presentation method for use in a multi-display computer system is provided. The method comprises generating, by one or more processors, a first set of content items for presentation on a first display device of the multi-display computer system; generating, by the one or more processors, a second set of content items for presentation on a second display device of the multi-display computer system; upon receiving input information, the one or more processing devices modifying at least one of the first and second sets of content items; and presenting the modified content items on at least one of the first and second display devices, wherein presentation of the modified content includes swapping selected content between the first and second display devices.

In one example, modifying at least one of the first and second sets of content items is performed in response to an input received from a user of the multi-display computer system. Here, the received input may indicate either: a change in state for a currently running application; or a change in relative physical position of one or both of the first and second display devices.

In another example, swapping the selected content includes interchanging one or more user interface elements between the first and second display devices. In a further example, swapping the selected content includes either (i) linearly scrolling the selected content between the first and second display devices or (ii) rotating the selected content in a clockwise or counterclockwise direction between the first and second display devices. And in yet another example, at least one of the first and second sets of content items corresponds to one selected from the group consisting of: (i) a log-in interface; (ii) one or more applications; (iii) one or more widgets; (iv) thumbnail images; (v) audio content; and (vi) video content.

In one scenario, the received input information identifies that: an input device of the multi-display computer system has been pressed; an icon presented on either the first or the second display device has been selected; or an orientation of the multi-display computer system has changed from a first orientation to a second orientation. The orientation change may indicate a physical rotation of the first and second display screens.

In another scenario, the first set of content items are presented on the first display device and the second set of content items are presented on the second display device when the first display device is closer to the user than the second display device. And in a further scenario, the first set of content items includes one or more interactive elements configured to receive input from a user, and the second set of content items includes active content being presented to the user.

In accordance with other aspects of the disclosure, a multi-display client computing device is provided. The device comprises a first display housing including a first display device therein, a second display housing including a second display device therein, one or more position and orientation sensors operatively coupled to at least one of the first and second display housings, and one or more processors operatively coupled to the first and second display devices and to the one or more position and orientation sensors. The one or more processors are configured to generate a first set of content items for presentation on the first display device; generate a second set of content items for presentation on the second display device; upon receiving input information from an input source, modify at least one of the first and second sets of content items; and cause the modified content items to be presented on at least one of the first and second display devices. Presentation of the modified content includes swapping selected content between the first and second display devices.

In one example, each of the first and second display devices includes a touch sensitive input, and the input source is the touch sensitive input of one of the first and second display devices. In another example, swapping the selected content includes either (i) linearly scrolling the selected content between the first and second display devices or (ii) rotating the selected content in a clockwise or counterclockwise direction between the first and second display devices. In a further example, the received input information identifies that an orientation of one or both of the first and second display housings has changed from a first orientation to a second orientation as detected by the one or more position and orientation sensors. Here, the orientation change may indicate a physical rotation of at least one of the first and second display housings. And upon detection of the physical rotation, the modified content may be rotated in at least one of the first and second display screens.

In accordance with further aspects of the disclosure, a computer-implemented content presentation method for use in a multi-display computer system is provided. The method comprises preparing, by one or more processors, selected content for presentation on a first display device of the multi-display computer system; generating, by the one or more processors, one or more control elements for presentation on a second display device of the multi-display computer system, the control elements being operatively associated with the selected content to enable manipulation or modification of the selected content in response to an input signal; and performing, by the one or more processors, a screen swapping operation to move the selected content from the first display device to the second display device, and to concurrently move the one or more control elements from the second display device to the first display device.

In one example, the screen swapping operation is performed in response to either a received instruction or signal provided to the multi-display computer system, or physical rotation of one or both of the first and second display devices. Here, upon detection of the physical rotation, an orientation of one or both of the selected content and the one or more control elements may be rotated in a corresponding one of the first and second display devices.

And in another example, performing the screen swapping operation includes providing an appearance of either (i) linearly exchanging the selected content and the one or more control elements or (ii) rotating the selected content and the one or more control elements in a clockwise or counterclockwise direction.

BRIEF DESCRIPTION OF THE DRAWINGS

FIGS. 2A-G illustrate an example log-in use according to aspects of the disclosure.

FIG. 9 is a flow diagram of an example method according to aspects of the disclosure.

DETAILED DESCRIPTION

Overview

The technology relates to content presentation in a dual-screen type client device, such as a laptop, tablet, netbook or other type of portable client device. As noted above, inputs for the UI may be presented one or both of the display screens depending on how a user is interacting with the client device and the type(s) of program(s) being used. Content or information switching between the screens is provided in a seamless manner, which provides the user with an enjoyable interactive experience that can benefit productivity.

Generally, there are two general kinds of switching that may occur. One is UI switching, in which icons, content, control elements, etc., are swapped between the two physical display screens. This could be done, for example, by counterclockwise or clockwise rotation of the items, or up/down scrolling of the items, between two (stationary) screens. The other kind of switching is physical display screen switching. For instance, when the physical display screens are moved from 2 vertical screens to 2 horizontal screens, items on at least one of the two screens are also rotated for ease of interaction. This enables an application to provide the necessary tools to the user as he/she needs them.

These features can be implemented in a variety of use cases. Such use cases include logging into an account, application or widget selection, enhanced image or web browsing, video conferencing, and more. These types of use cases are discussed in detail below. Before that, an example multi-screen system is presented.

Example Systems

Figure 1A:
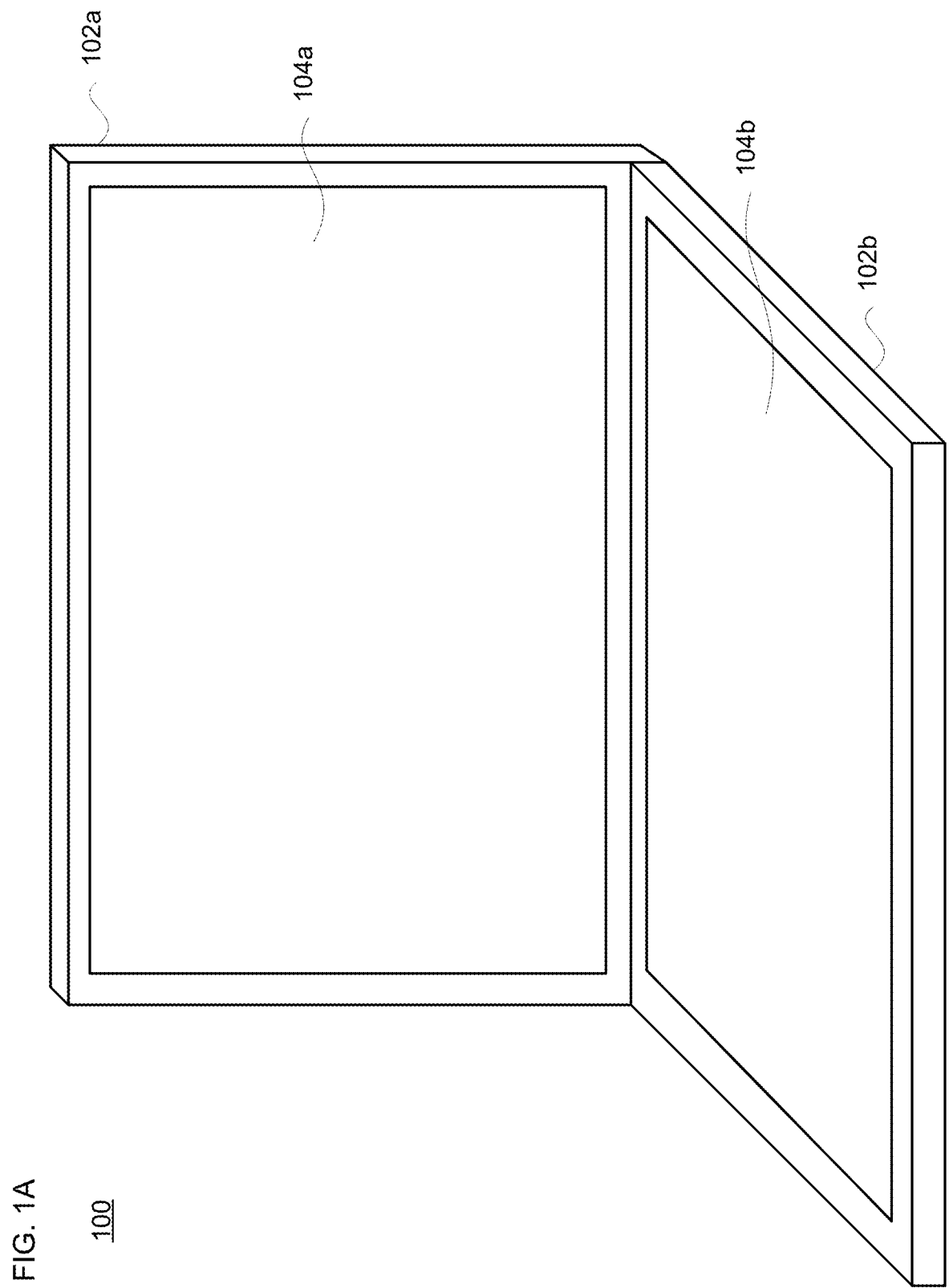
FIGS. 1A-B illustrate an example dual display screen client device according to aspects of the disclosure.
Figure 1B:
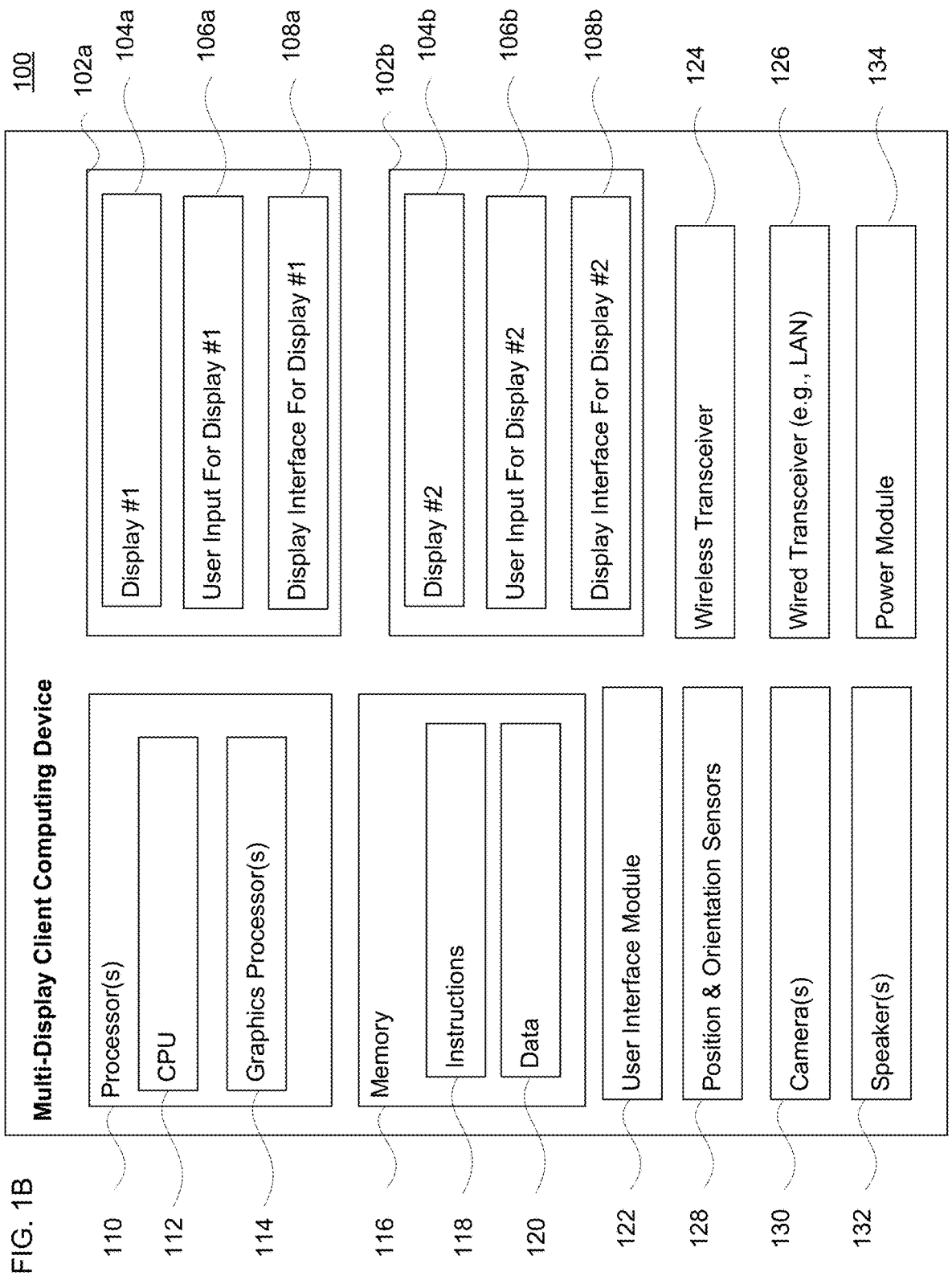

FIGS. 1A and 1B illustrate an example dual screen client device 100. As shown in FIG. 1A, the device 100 includes a first display housing 102a and a second display housing 102b. Each housing includes a respective display device 104a or 104b. By way of example, the display devices may be TFT LCD (Thin-Film-Transistor Liquid Crystal Display) or OLED (Organic Light Emitting Diode) displays. And as shown in FIG. 1B, each display housing 102 also includes respective user input(s) 106a, 106b, and display interfaces 108a, 108b. The user input(s) for each display housing may include a touch screen element such as a capacitive or resistive touch screen, as well as physical input buttons, keys, switches, dials, slides, a microphone, a mouse, a pen input, trackball, etc. In addition to visual feedback via the display devices, the system may audio and/or sensory (e.g., tactile) feedback.

Other components of the client device 100 are also shown in FIG. 1B. These include one or more computer processors 110 such as a central processing unit 112 and/or graphics processors 114, as well as memory 116 configured to store instructions 118 and data 120. The processors may or may not operate in parallel, and may include ASICs, controllers and other types of hardware circuitry. The processors are configured to receive information from a user through the user inputs 106 and user interface module 122, and to present information to the user on the display devices 104 via the display interfaces 108. User interface module 122 may receive commands from a user via the user inputs and convert them for submission to a given processor. Each display interface may comprise appropriate circuitry for driving the corresponding display device to present graphical and other information to the user. By way of example, the graphical information may be generated by the graphics processors 114, while CPU 112 manages overall operation of the client device 100.

Memory 116 can be implemented as one or more of a computer-readable medium or media, a volatile memory unit or units, or a non-volatile memory unit or units. The memory 116 may include, for example, flash memory and/or NVRAM, and may be embodied as a hard-drive or memory card. Alternatively the memory 116 may also include DVD, CD-ROM, write-capable, and read-only memories. In one implementation, a computer program product is tangibly embodied in an information carrier. The computer program product contains instructions, such as instructions 118 that, when executed by one or more processors, perform one or more methods such as those described herein. The information carrier is a computer- or machine-readable medium, such as memory 116. Although FIG. 1B functionally illustrates the processor(s), memory, and other elements of device 100 as being within the same overall block, such components may or may not be stored within the same physical housing.

The data 120 may be retrieved, stored or modified by the processors in accordance with the instructions 118. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 118 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 1B, the dual-display computing device 100 includes one or more communication devices for communicating with other devices and systems. The communication devices include one or both of wireless transceiver 124 and/or wired transceiver 126, which may provide a local area network (LAN) connection. The device 100 may communicate with other remote devices via these connections using various configurations and protocols, including short range communication protocols such as near-field communication, Bluetooth, Bluetooth LE, the Internet, intranets, virtual private networks, wide area networks, local networks, private networks using communication protocols proprietary to one or more companies, Ethernet, WiFi and HTTP, and various combinations of the foregoing.

In addition, the device 100 as shown includes one or more position and orientation sensors 128. The position and orientation sensors 128 are configured to determine the position and orientation of client computing device 100. For example, these components may include a GPS receiver to determine the device's latitude, longitude and/or altitude as well as an accelerometer, gyroscope or another direction/speed detection device. Each display housing 102 may include its own set of position and orientation sensors 128. The device 100 also includes one or more camera(s) 130 for capturing still images and recording video streams, speaker (s) 132 and a power module 134.

Example Methods and Use Cases

As noted above, features of the technology can be implemented in a variety of use cases. Examples of such scenarios are discussed below and with reference to the accompanying figures.

Figure 2B:
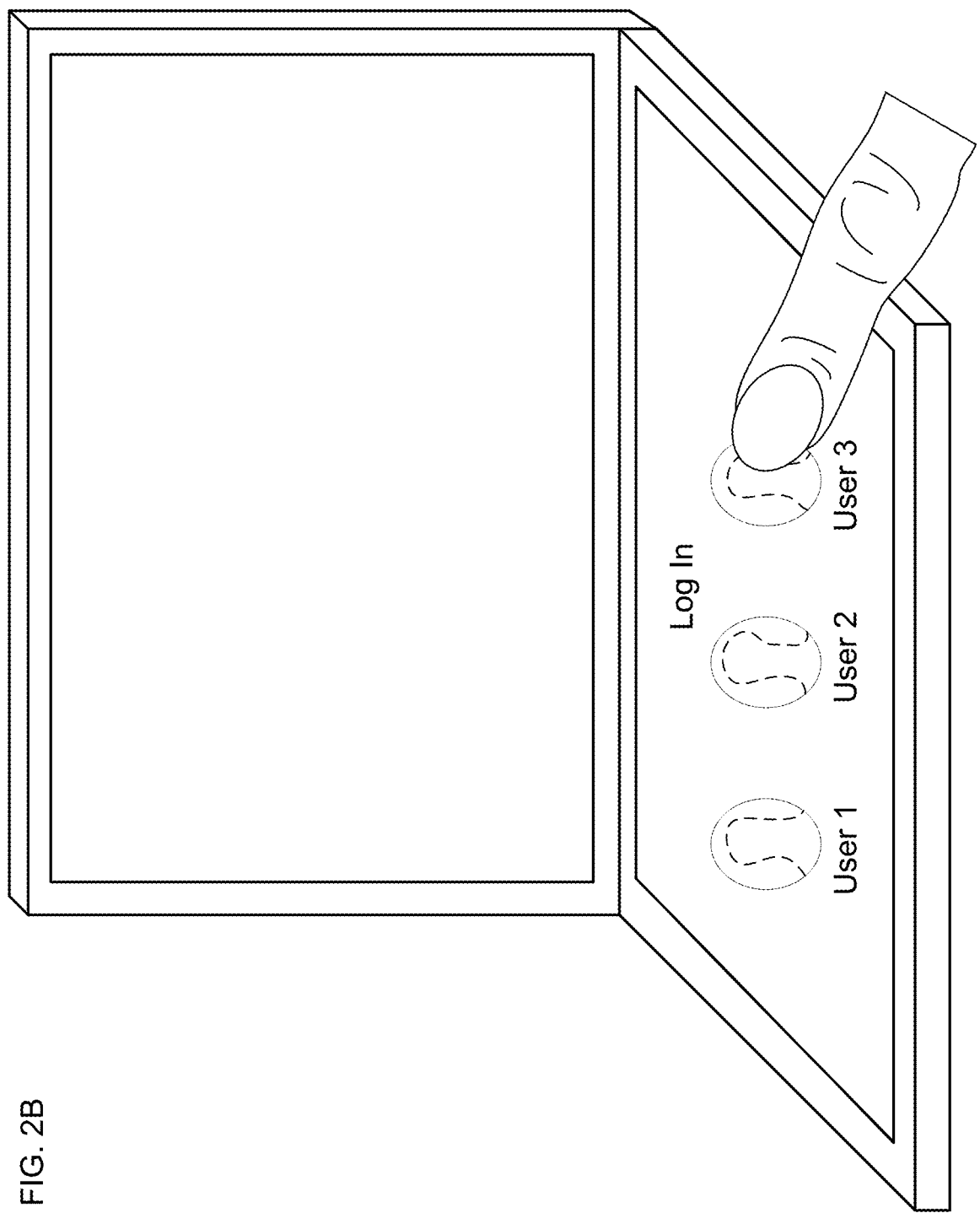

FIGS. 2A-G illustrate one scenario 200 for when a user logs onto the client device 100 or logs into a particular application. In this case, as shown in FIG. 2A, the user may open or otherwise access the device 100, which provides an initial login 202 on display screen 104b, which is the display screen closest to the user. The initial login 202 provides one or more options for the user to log in with. For instance, as shown, different user icons are presented.

Figure 2C:
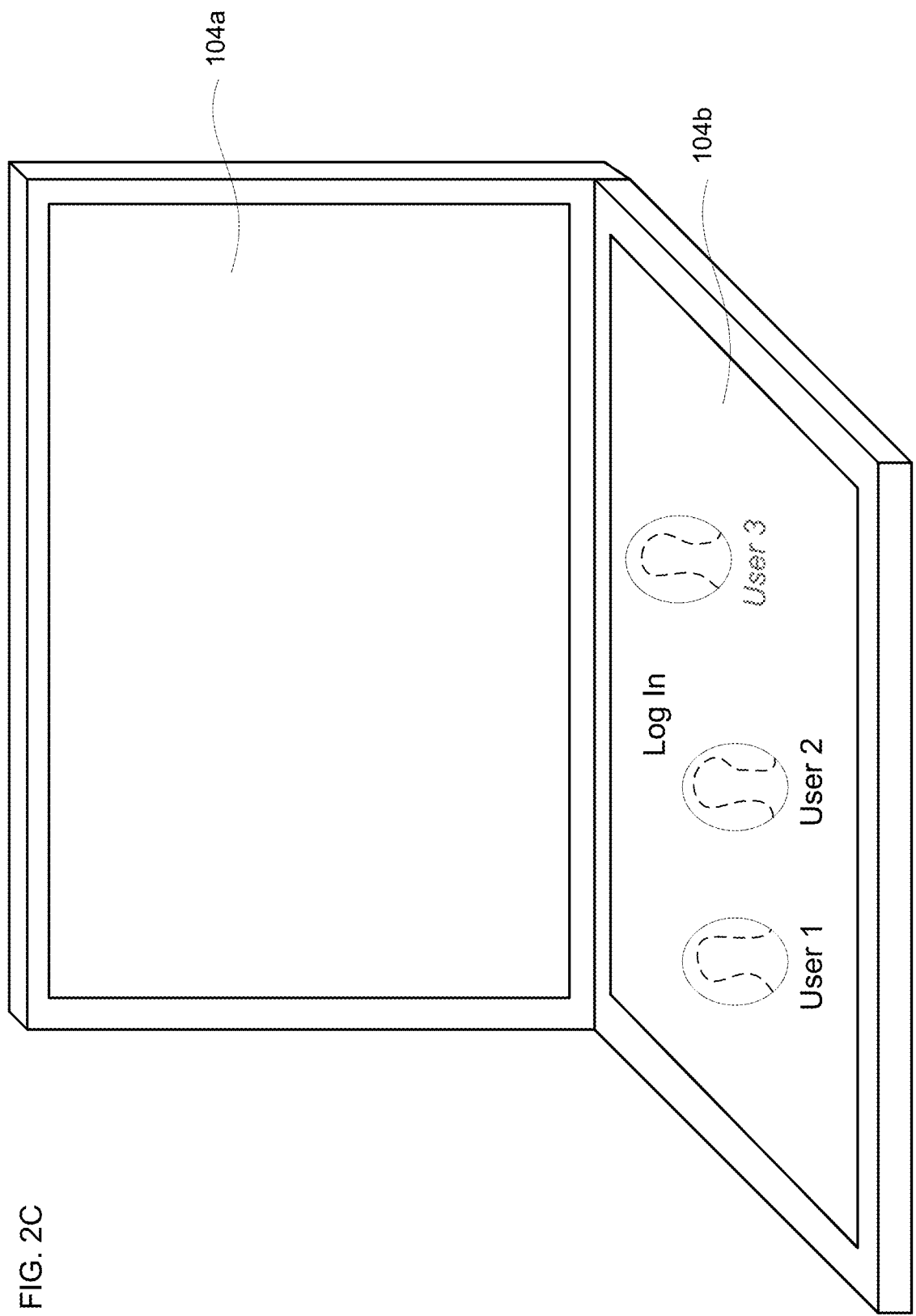
Figure 2D:
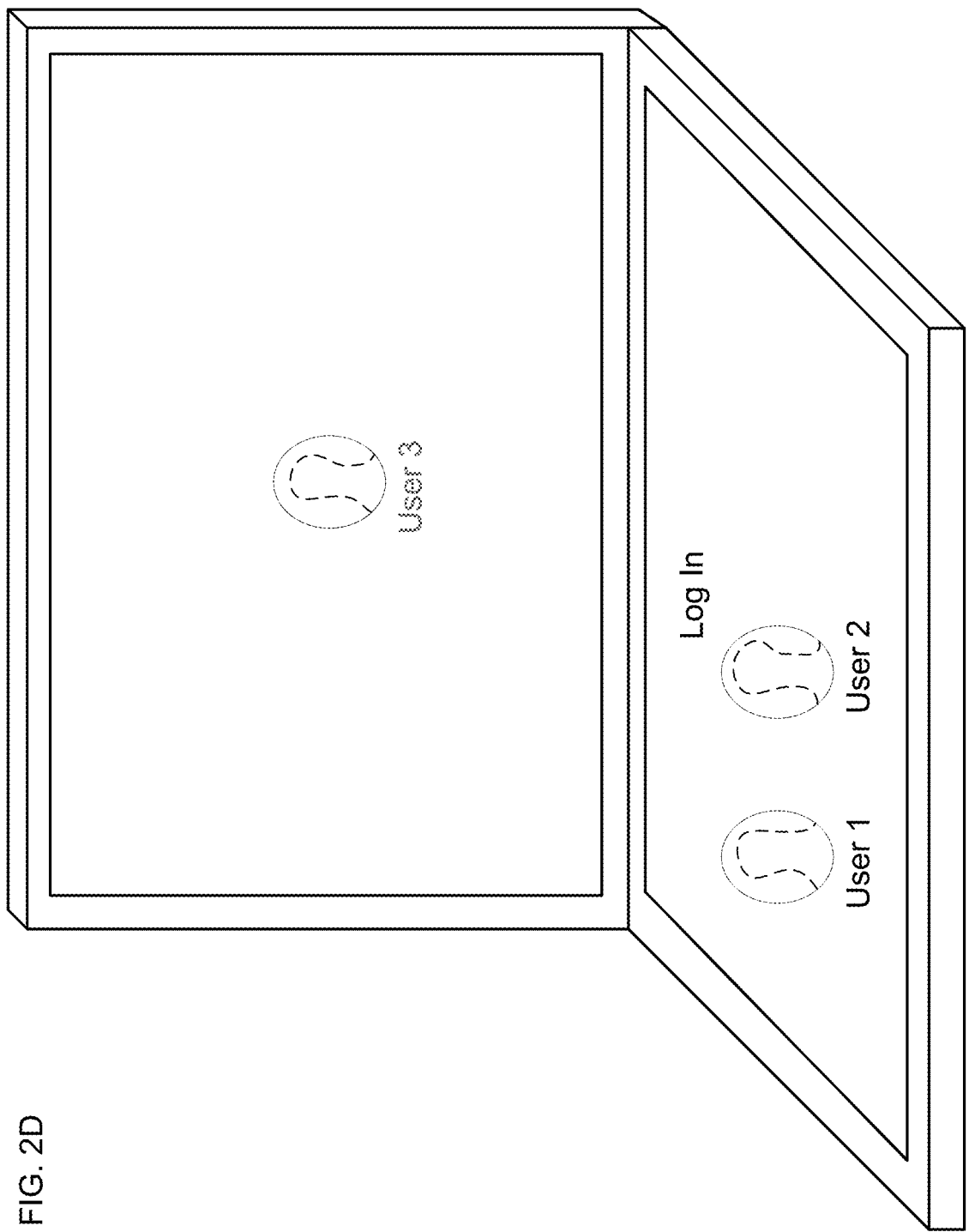

Then, as shown in FIG. 2B, the user may select a particular user icon, for example by pressing the display screen with his or her finger. Next, as shown in FIG. 2C, the selected icon representing the user's account begins "fly up" to display screen 104a. And as shown in FIG. 2D, the "fly up" process from one display screen to the other completes.

Figure 2E:
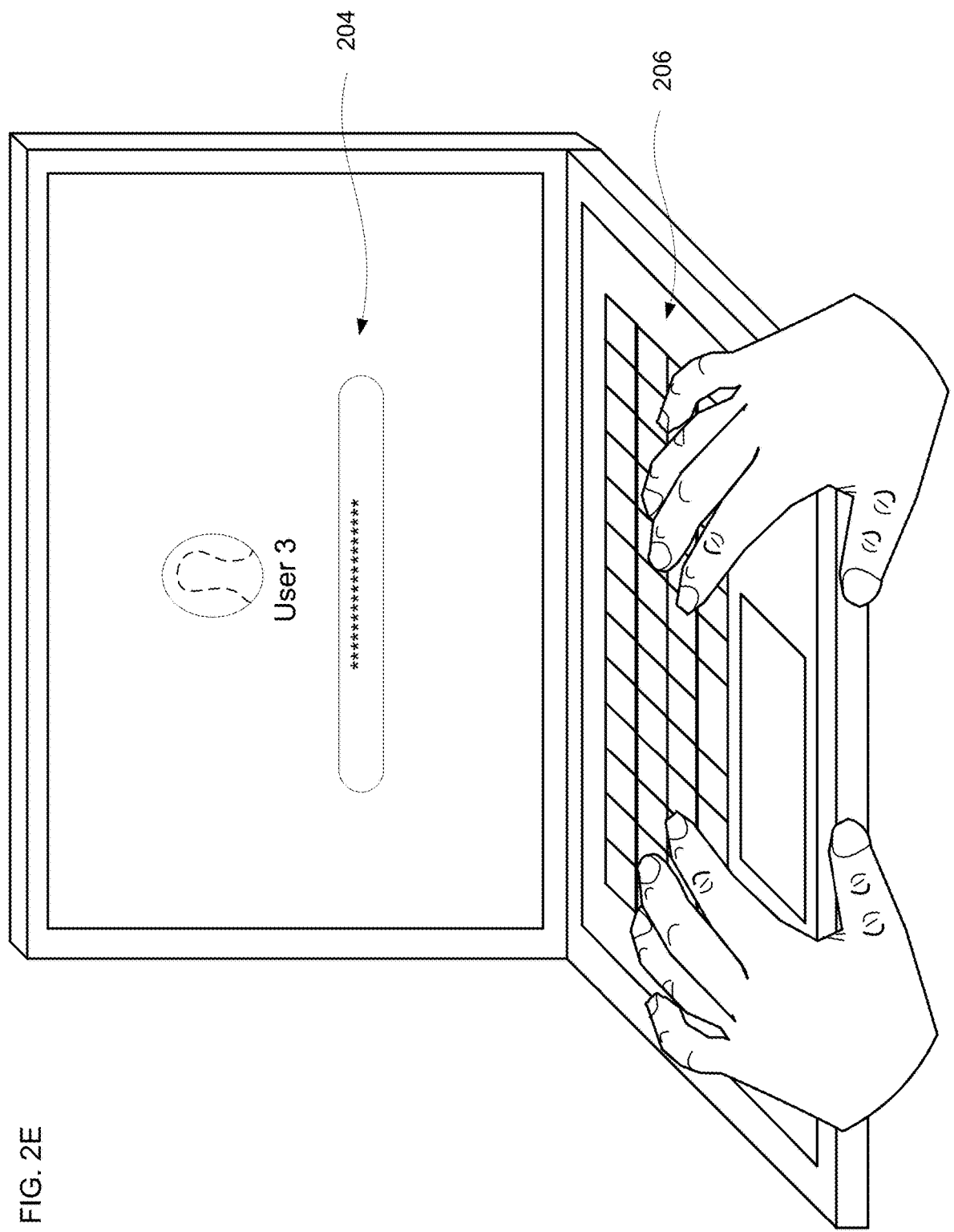
Figure 2F:
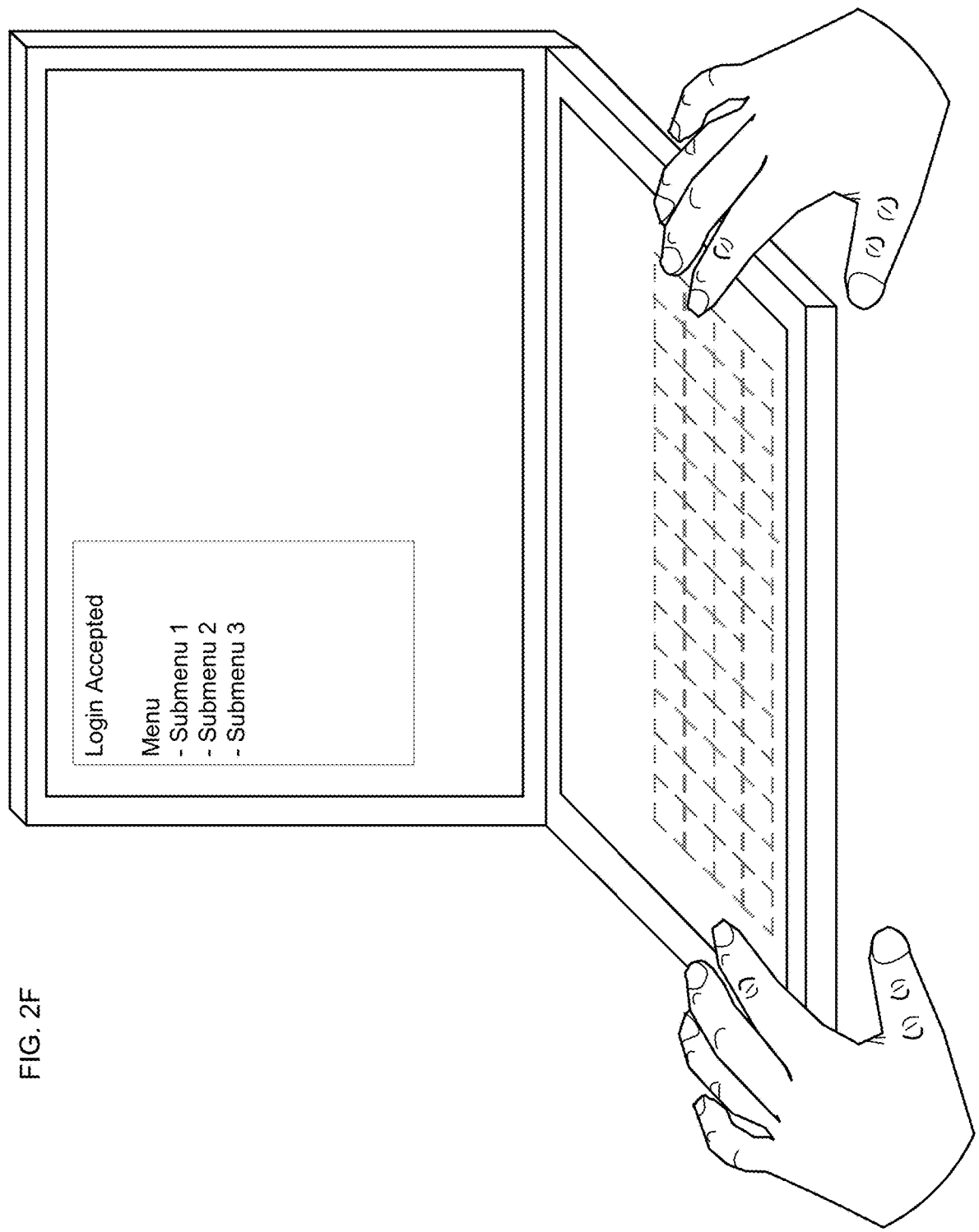
Figure 2G:
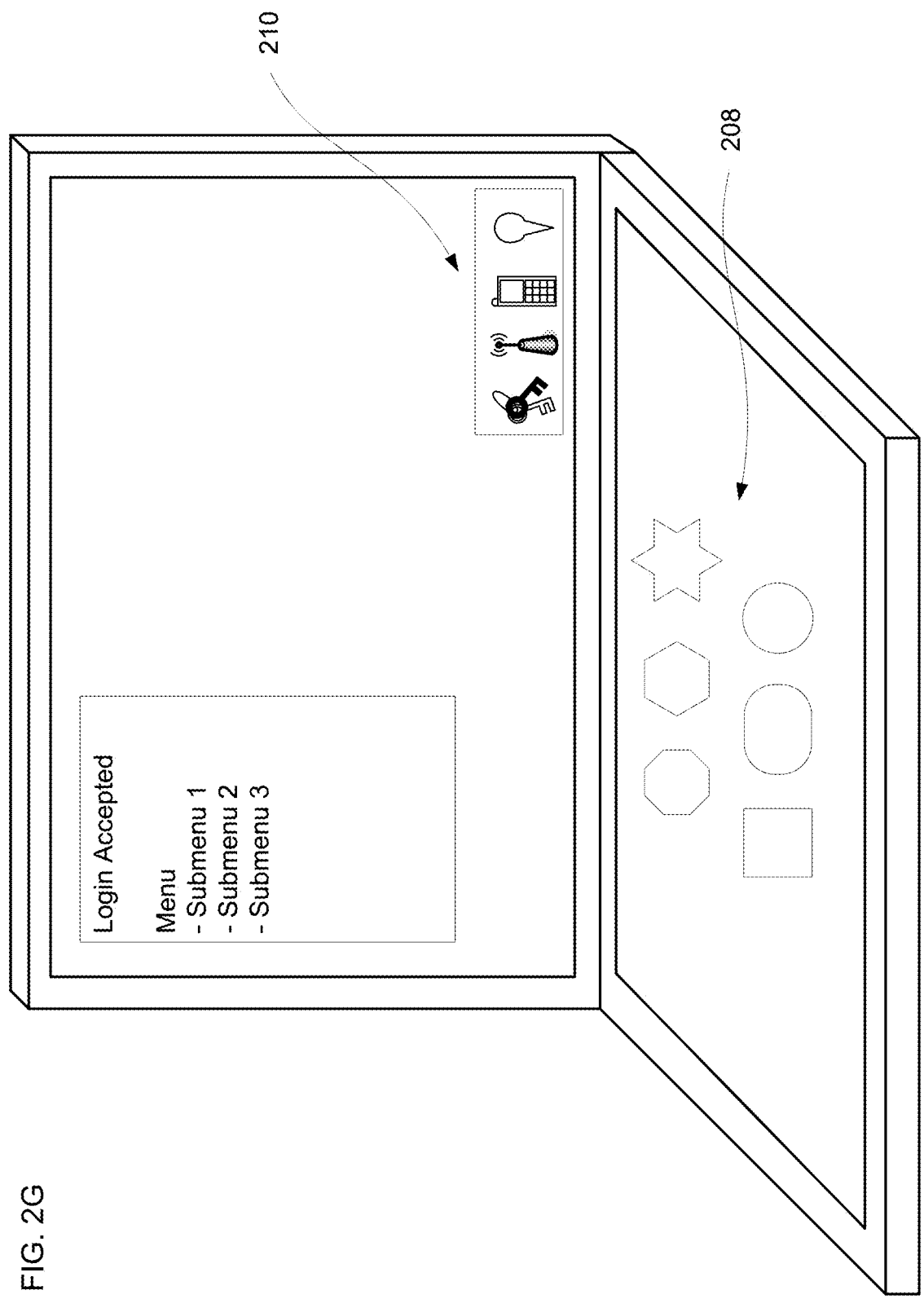

At this point, the user is able to log into his or her account. Here, as shown in FIG. 2E, a login entry field or box 204 is presented on display screen 104a, while a virtual keyboard or other account entry information 206 appears on display screen 104b. Once the user enters his or her account authentication information, the login may be accepted as shown in FIG. 2F. Here, as shown in FIGS. 2F and 2G, the virtual keyboard element may be replaced by icons or other elements of interest 208 on the display screen 104b, while certain information items 210 appear on the display screen 104a. FIG. 2F illustrates one example where the virtual keyboard appears to slide toward the user and out of the front of the device 100 as it fades away. The elements 208 and items 210 of FIG. 2G may be associated with various menu components of the current program or application that the user has logged onto. The user may access different submenus or other aspects of the program by selecting the elements 208 on one screen, while observing program status of other items of interest on the other screen. By way of example, the icons or other elements of interest 208, such as control elements, are easily accessible to the user via a first, closer display screen, while content such as images, videos, etc., are presented on the second, viewing screen.

Figure 3A:
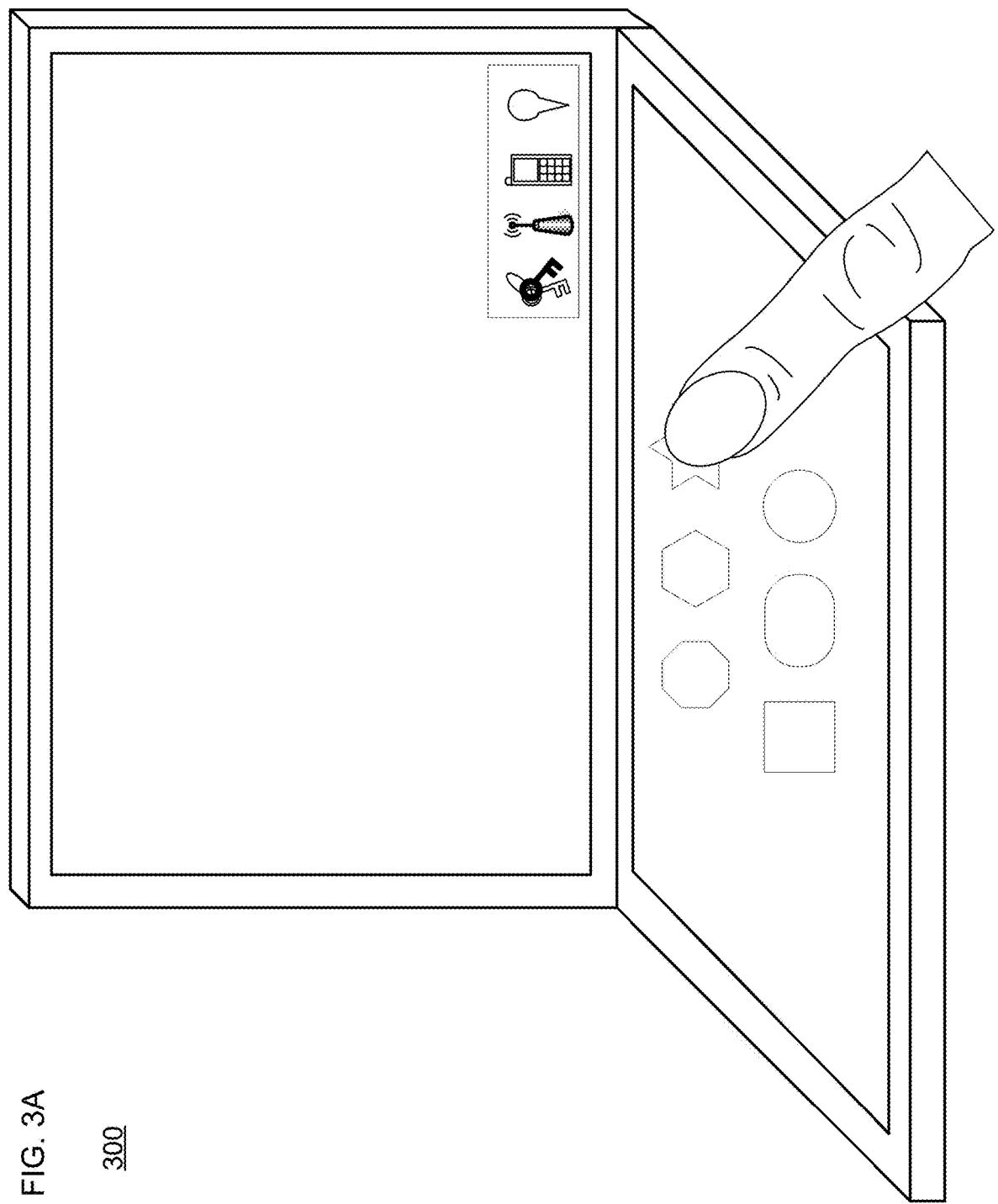
FIGS. 3A-C illustrate an example application launch according to aspects of the disclosure.
Figure 3B:
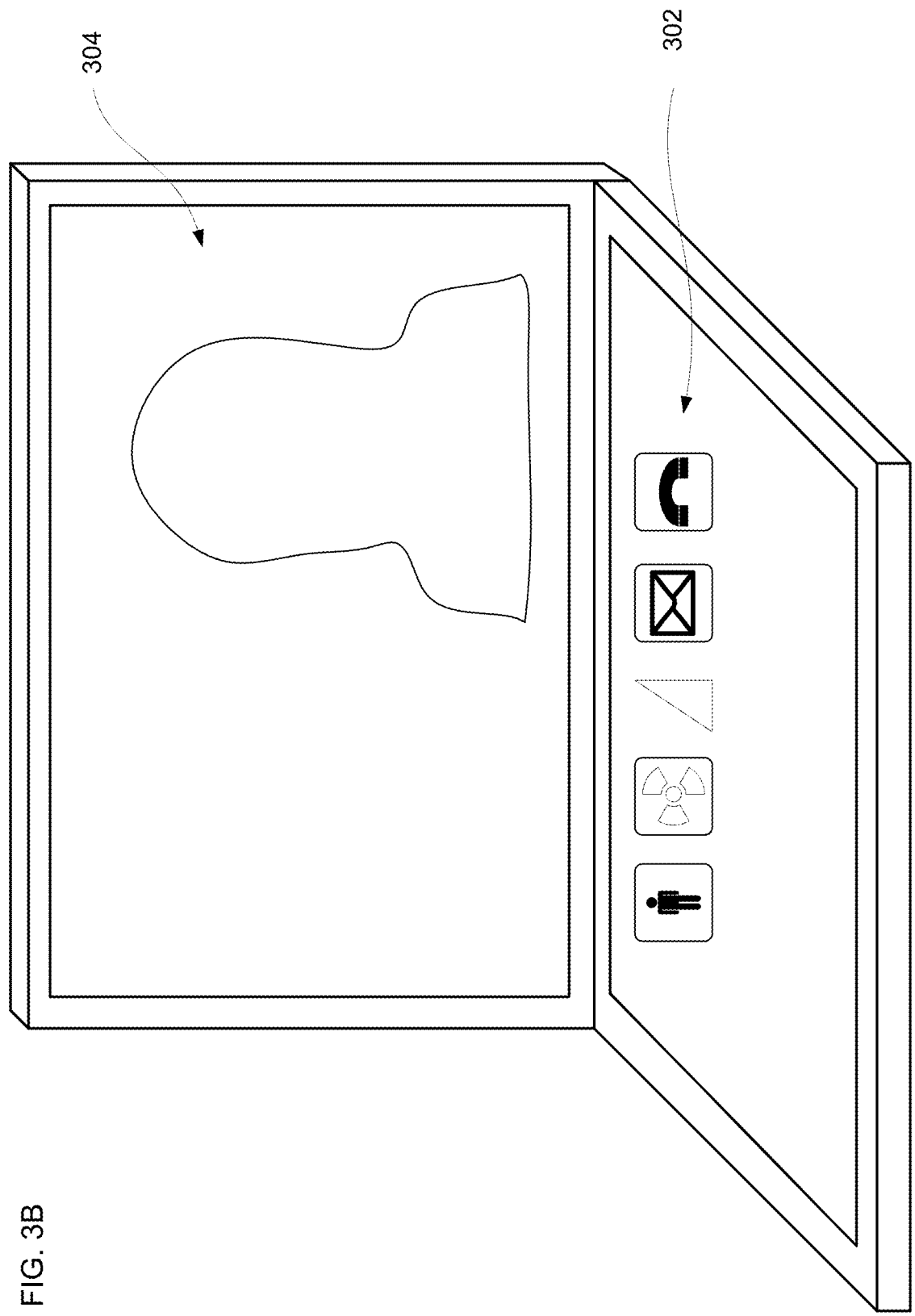
Figure 3C:
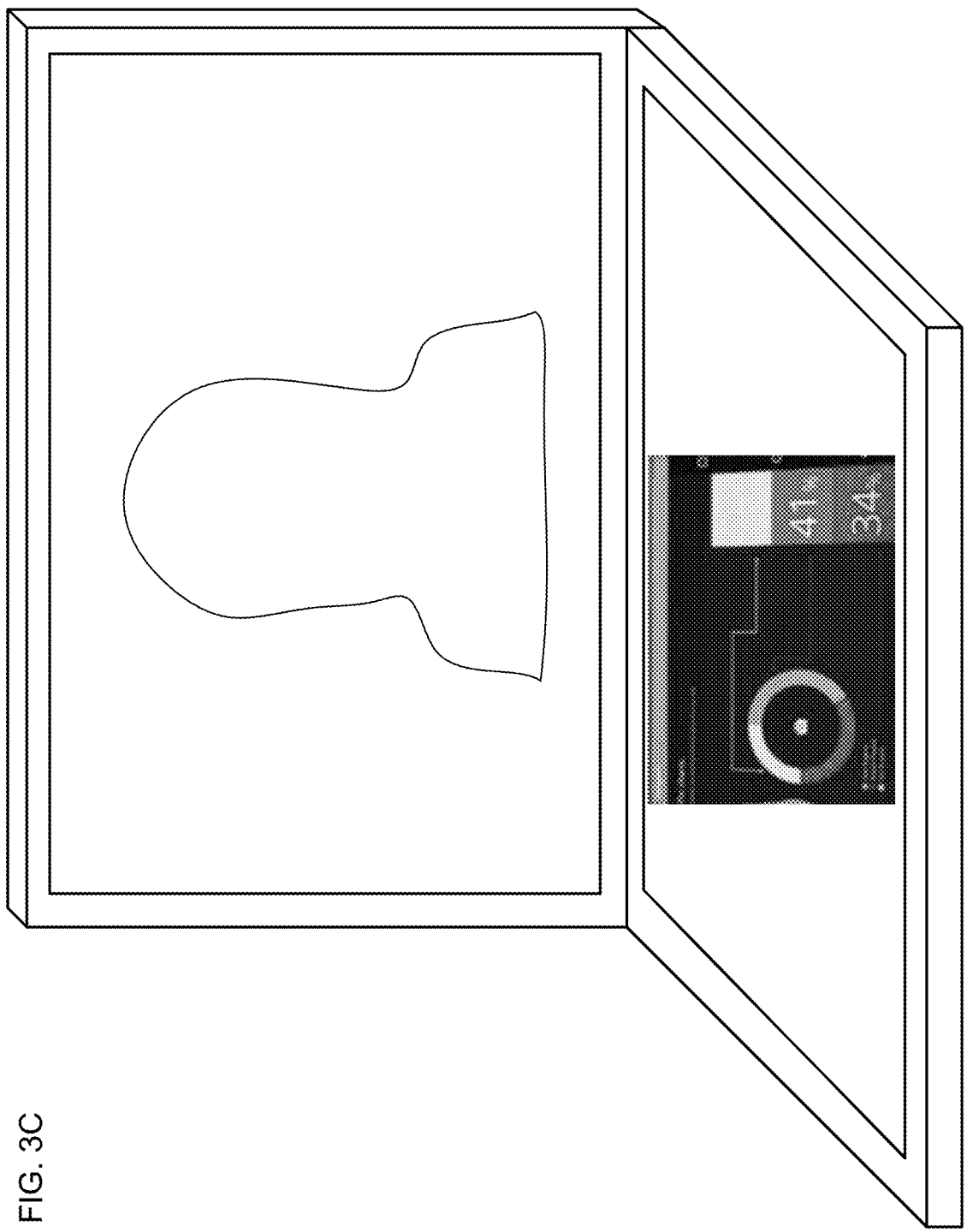

FIGS. 3A-C illustrate another scenario 300 for launching an application or a widget. In this case, as shown in FIG. 3A, the user chooses one of the elements 208 on the closer display screen, e.g., display screen 104b. This choice launches that particular application or widget, for instance a videoconference application, as shown in FIG. 3B. Here, various icons or thumbnails 302, such as control elements, are presented on the closer screen while the content 304 such as the videoconference feed is presented on the other screen. FIG. 3C illustrates an instance where the videoconference is presented on upper screen 104a while a spreadsheet or other information is presented on lower screen 104b. Thus in this scenario, thumbnails, icons or static content may be presented on one display screen while active content such as a videoconference feed is presented on the other display screen.

Figure 4A:
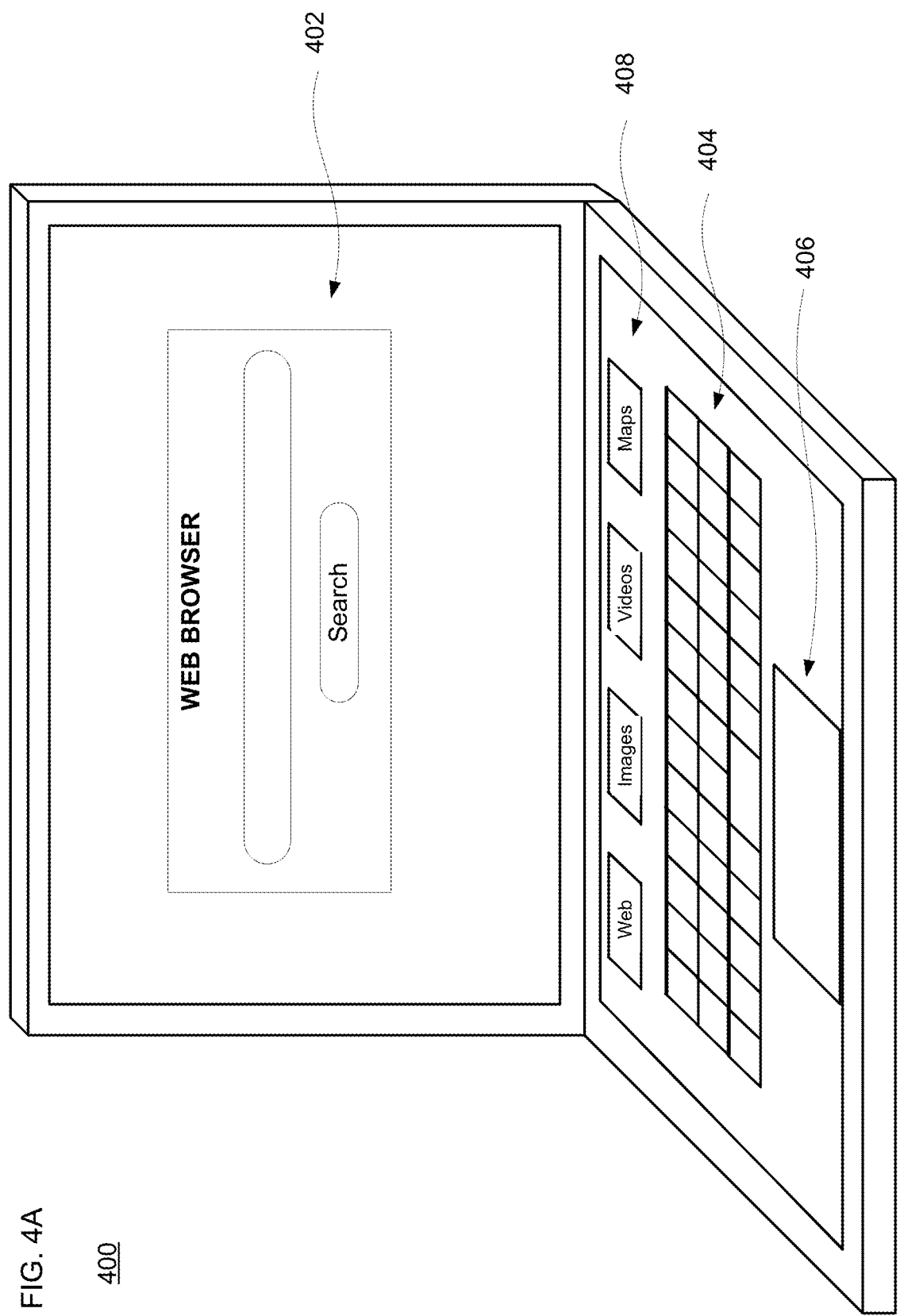
FIGS. 4A-4F illustrate examples of content searching and application switching and closing according to aspects of the disclosure.
Figure 4B:
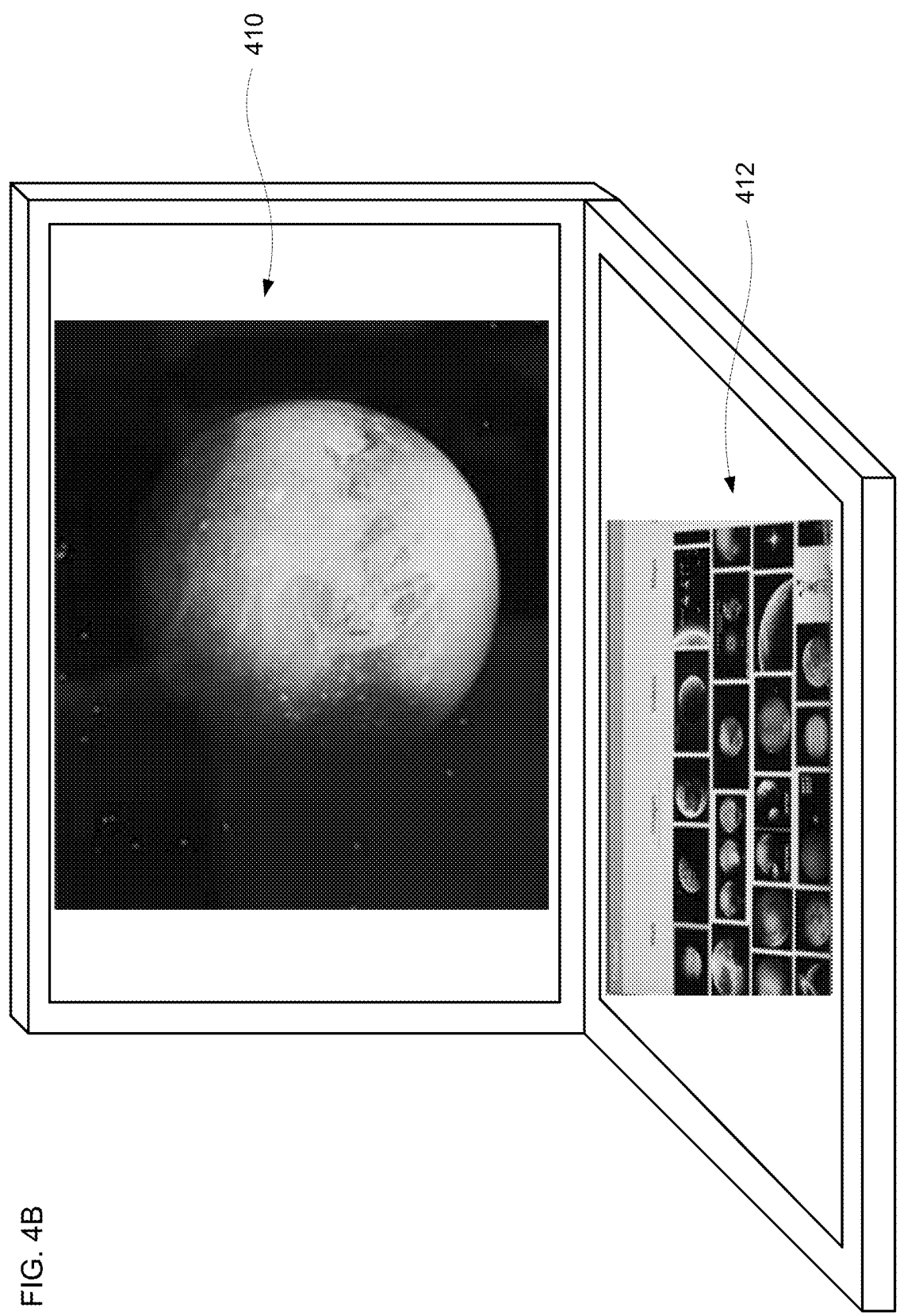

FIGS. 4A-4F illustrate yet another scenario 400 involving content searching. For instance, FIG. 4A provides an example web browser UI 402 on screen 104a while a virtual keyboard 404, mousepad 406 and application-relevant icons 408 are presented on screen 104b. In response to a user search, a request or other information, a particular piece of selected content 410 is presented on screen 104a while other search results (e.g., thumbnail images, icons, text, hyperlinks) 412 are presented on screen 104b, as shown in FIG. 4B. The other search results need not all be of the same size, and may differ in type of result (e.g., images versus text strings). The user may select different items in the screen 104b for display on screen 104a.

Figure 4C:
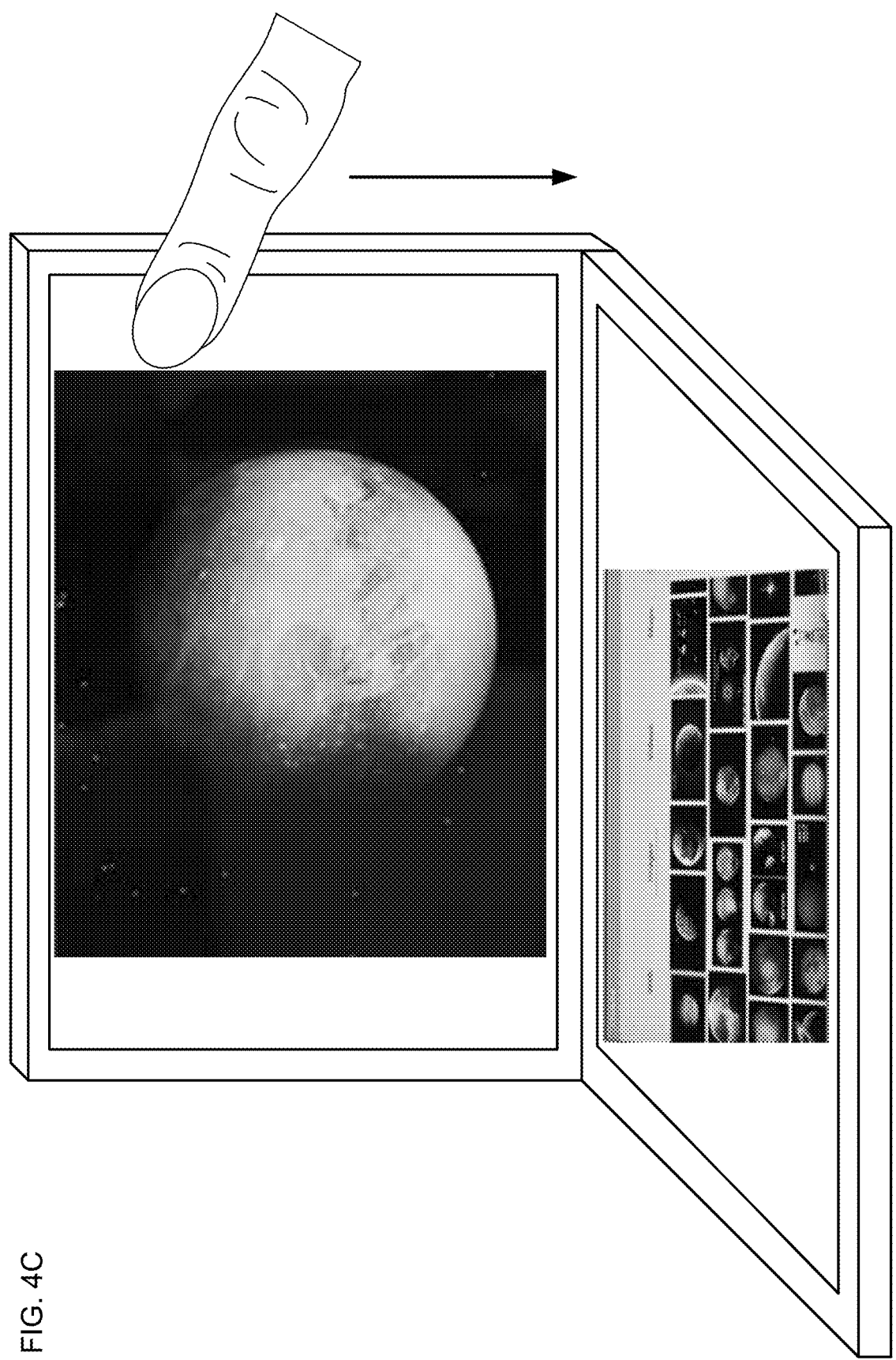
Figure 4D:
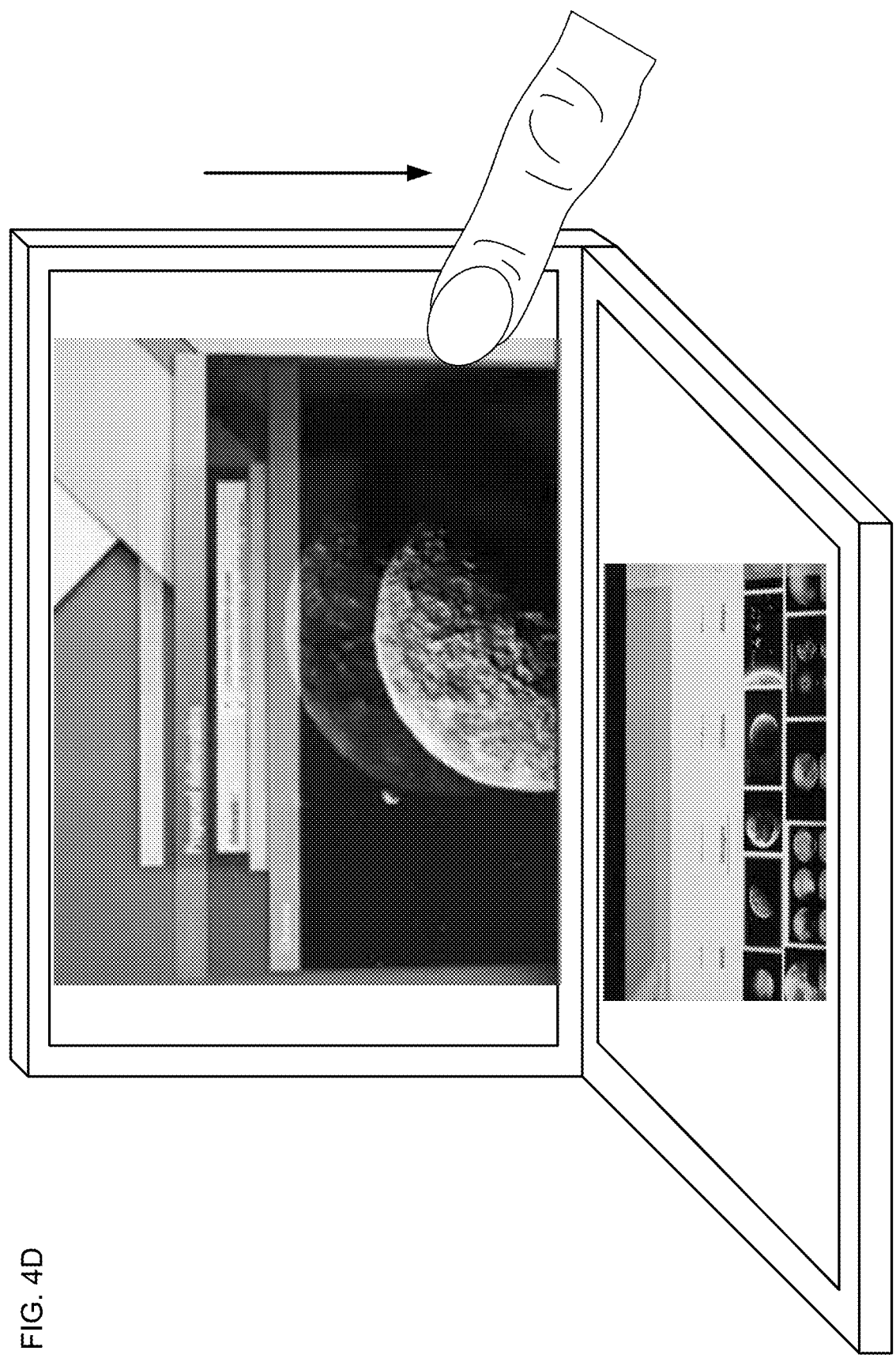
Figure 4E:
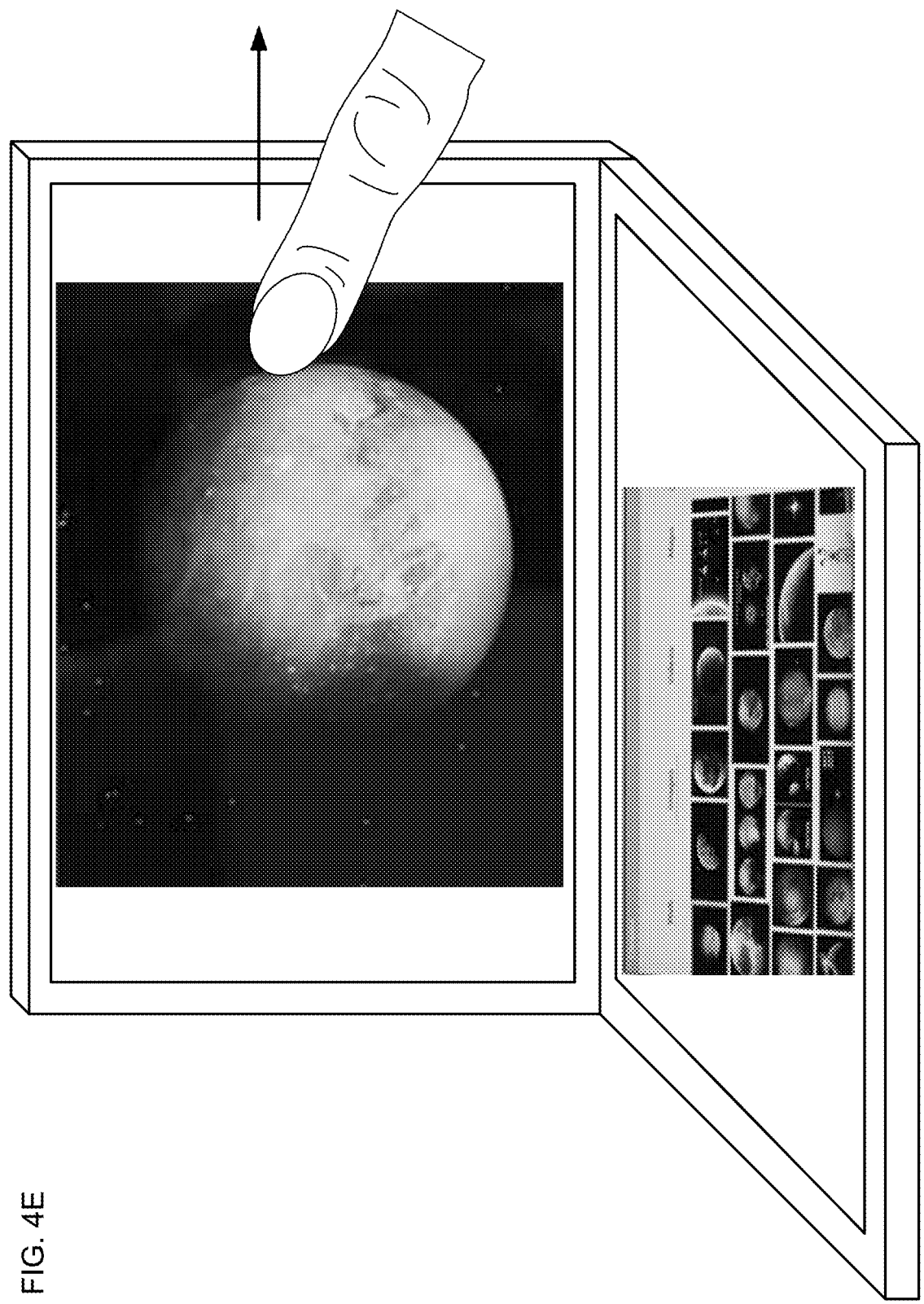
Figure 4F:
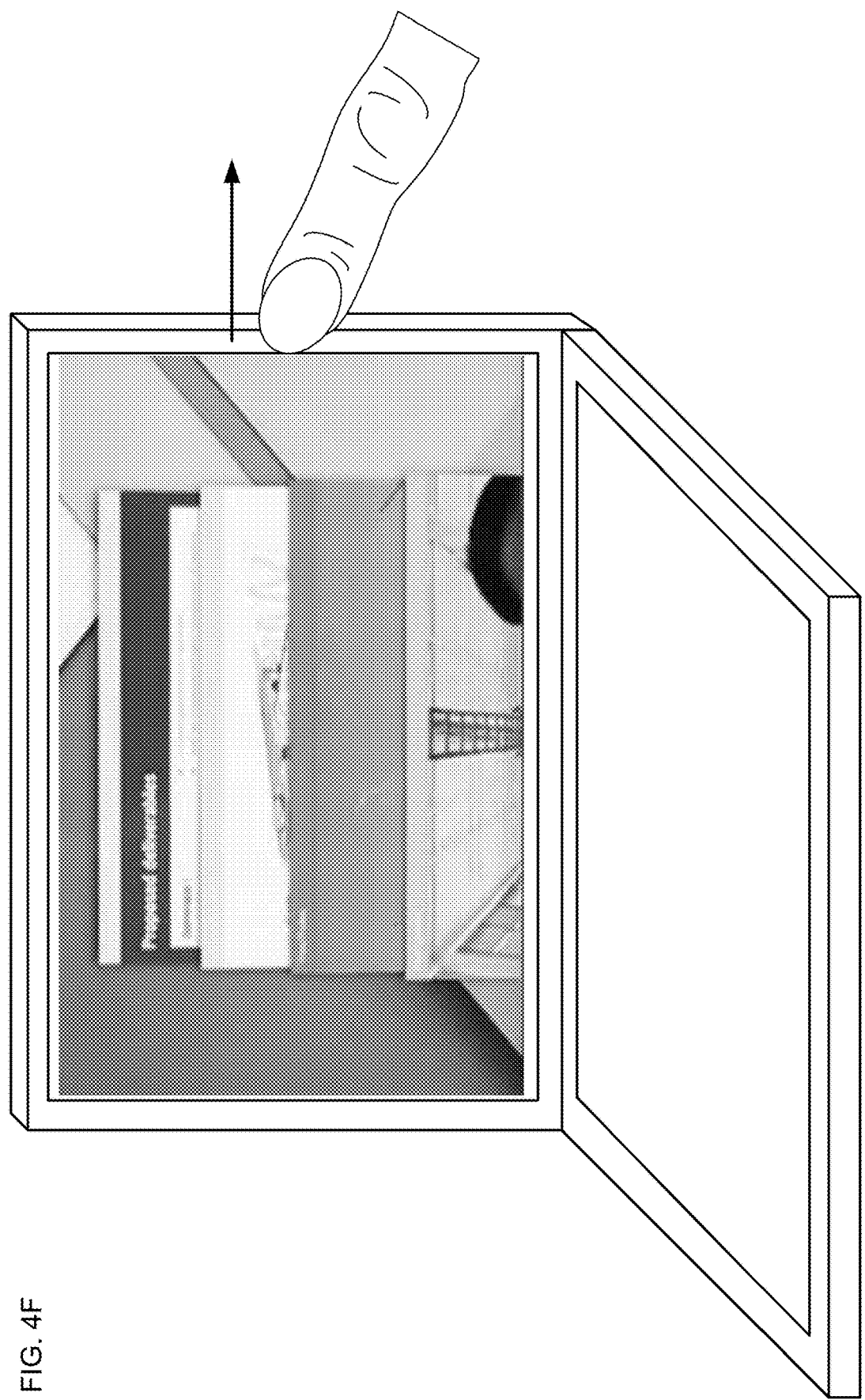

The user may switch applications by sliding the currently displayed content off of the screen. Here, for example, FIGS. 4C and 4D show the user sliding his or her finger in a first direction (e.g., downward) along at least a portion of the screen 104a. As this is done, both of the display screens may transition to a different application. The user may alternatively close the current application by sliding his or her finger in a different direction (e.g., sideways) along at least a portion of the screen 104a, as shown in FIGS. 4E and 4F.

Figure 5A:
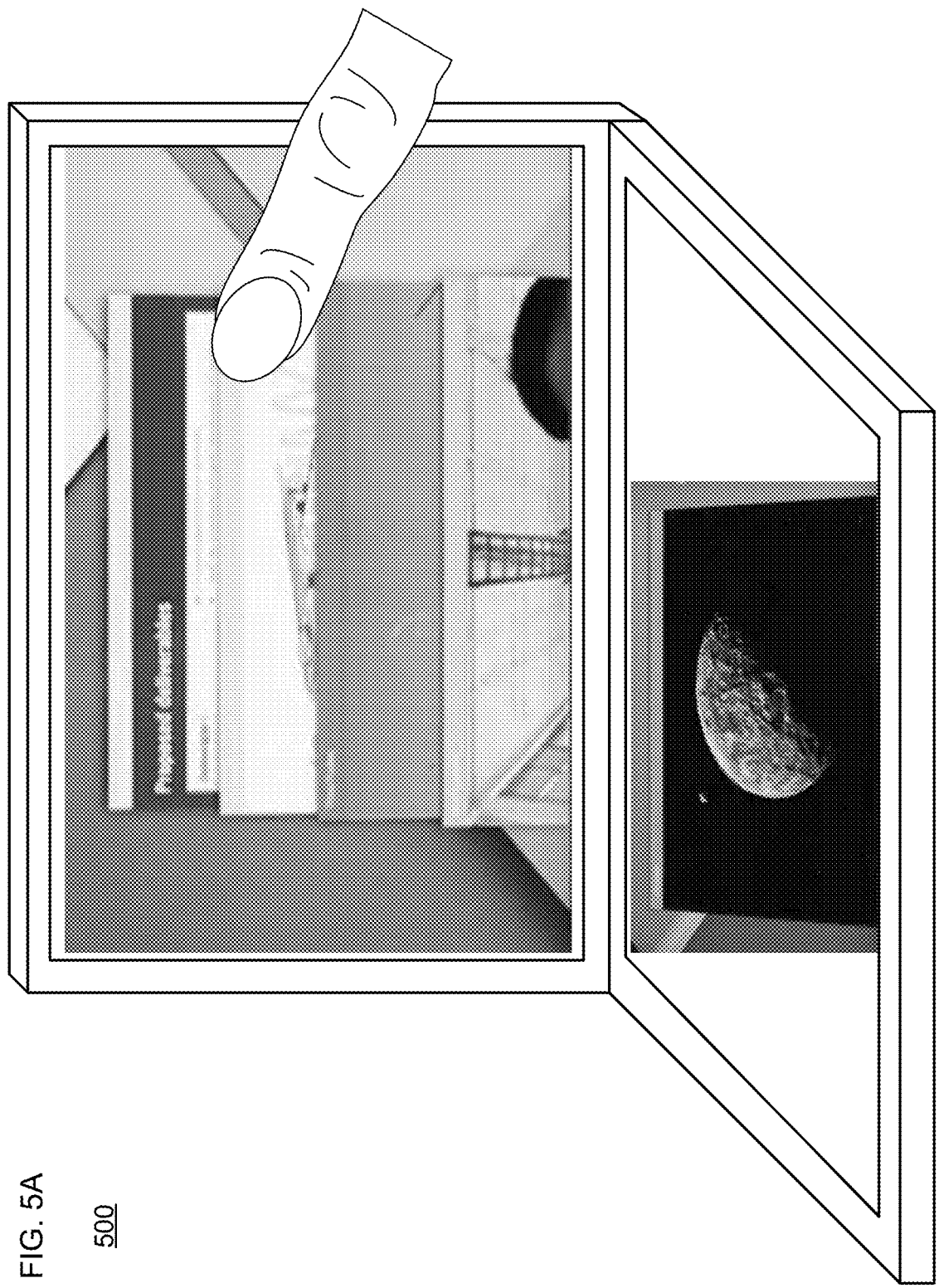
FIGS. 5A-5E illustrate operation of an example drawing application on a dual-screen arrangement according to aspects of the disclosure.
Figure 5B:
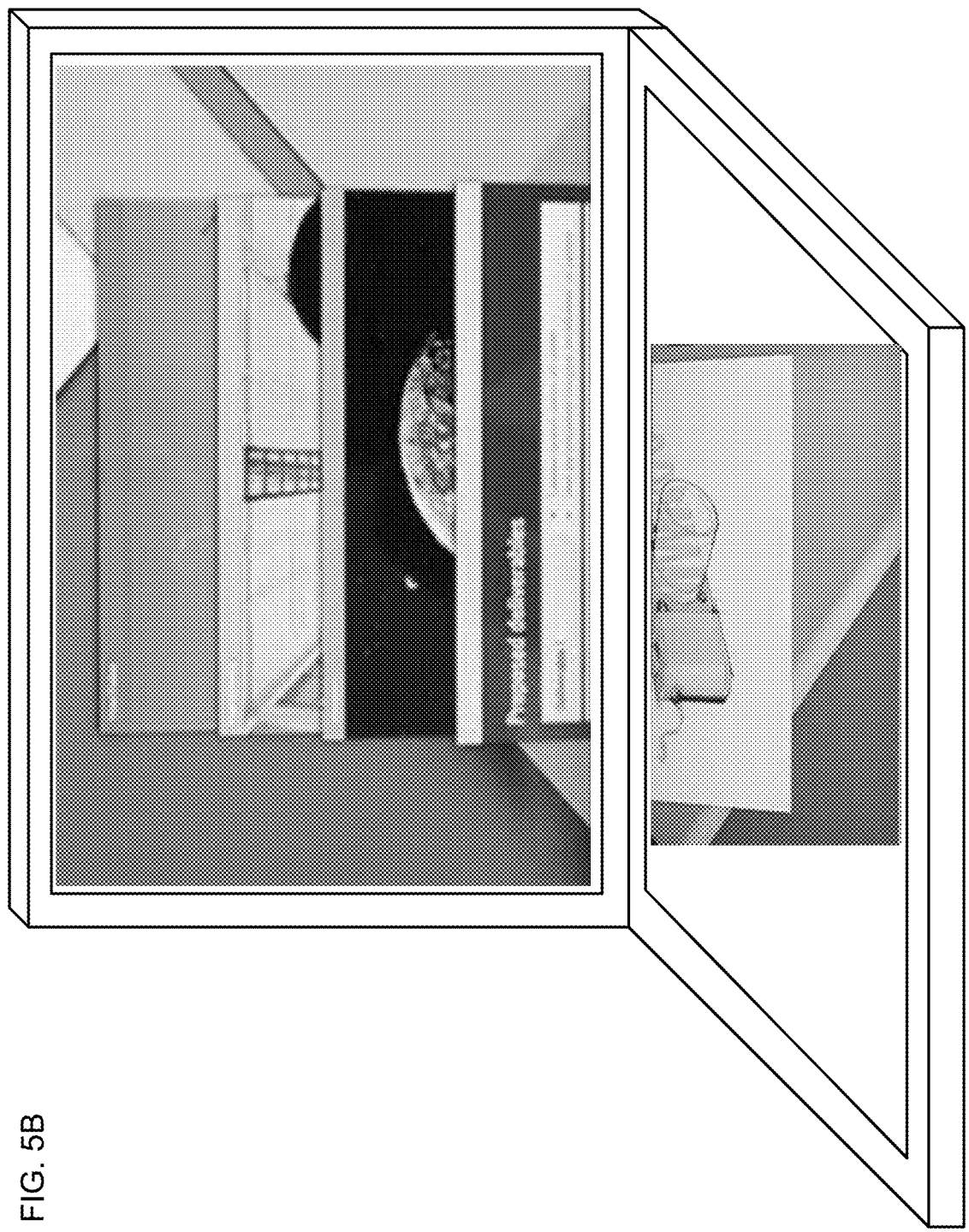

Another scenario is illustrated in FIGS. 5A-5E. Scenario 500 provides exemplary operation of a drawing application. Here, as shown in FIG. 5A, the user selects the drawing application from among a series of application displayed in overlapping fashion on display screen 104a. Other ways of presenting multiple applications may be employed, e.g., in a carousel view, side by side views, stacked views, etc. Once the application is selected, e.g., by tapping on the application with the user's finger or providing verbal instructions to the device 100 to open that particular application, a graphical representation of that application appears to slide into or otherwise open up in display screen 104b, as shown in FIG. 5B.

Figure 5C:
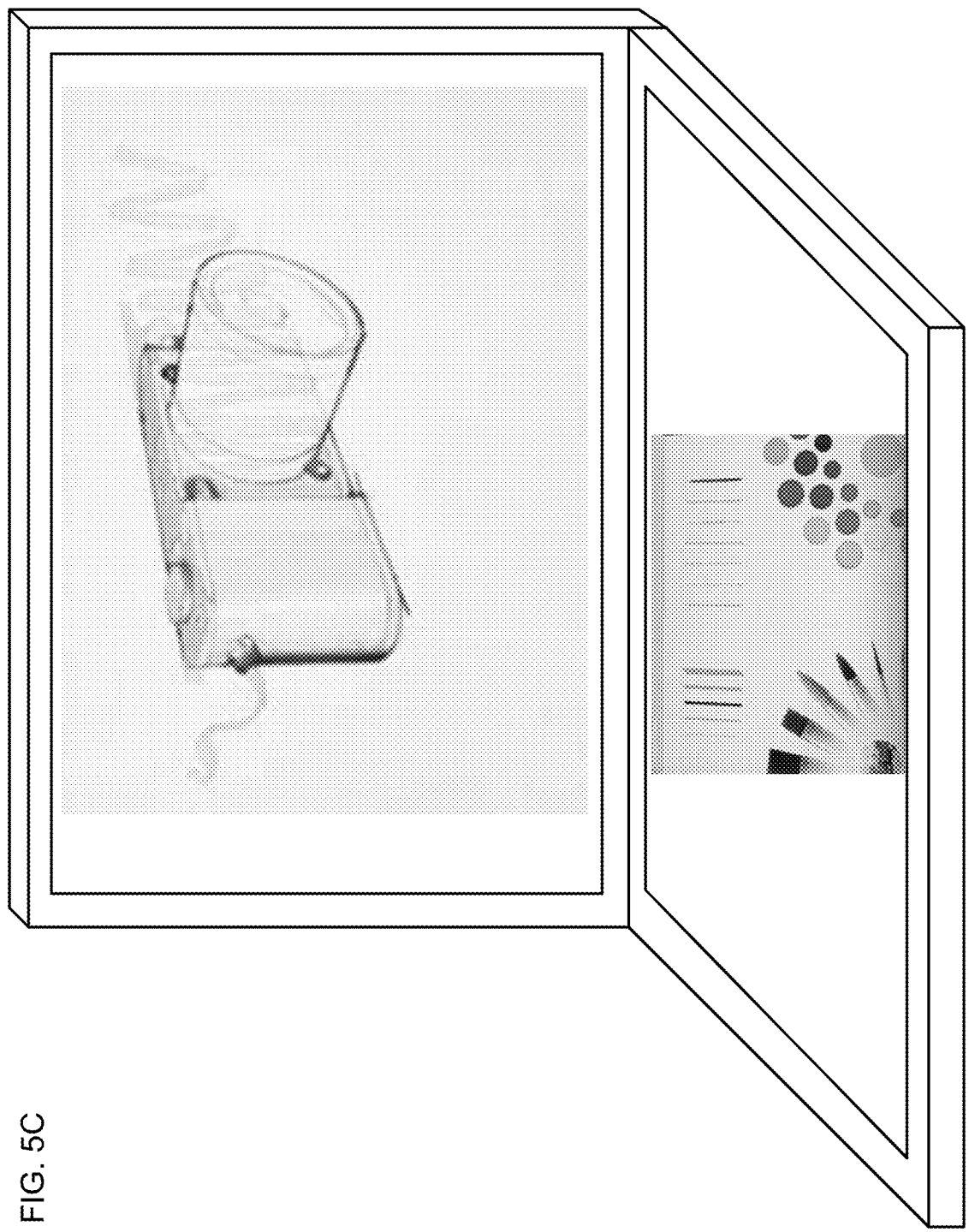
Figure 5D:
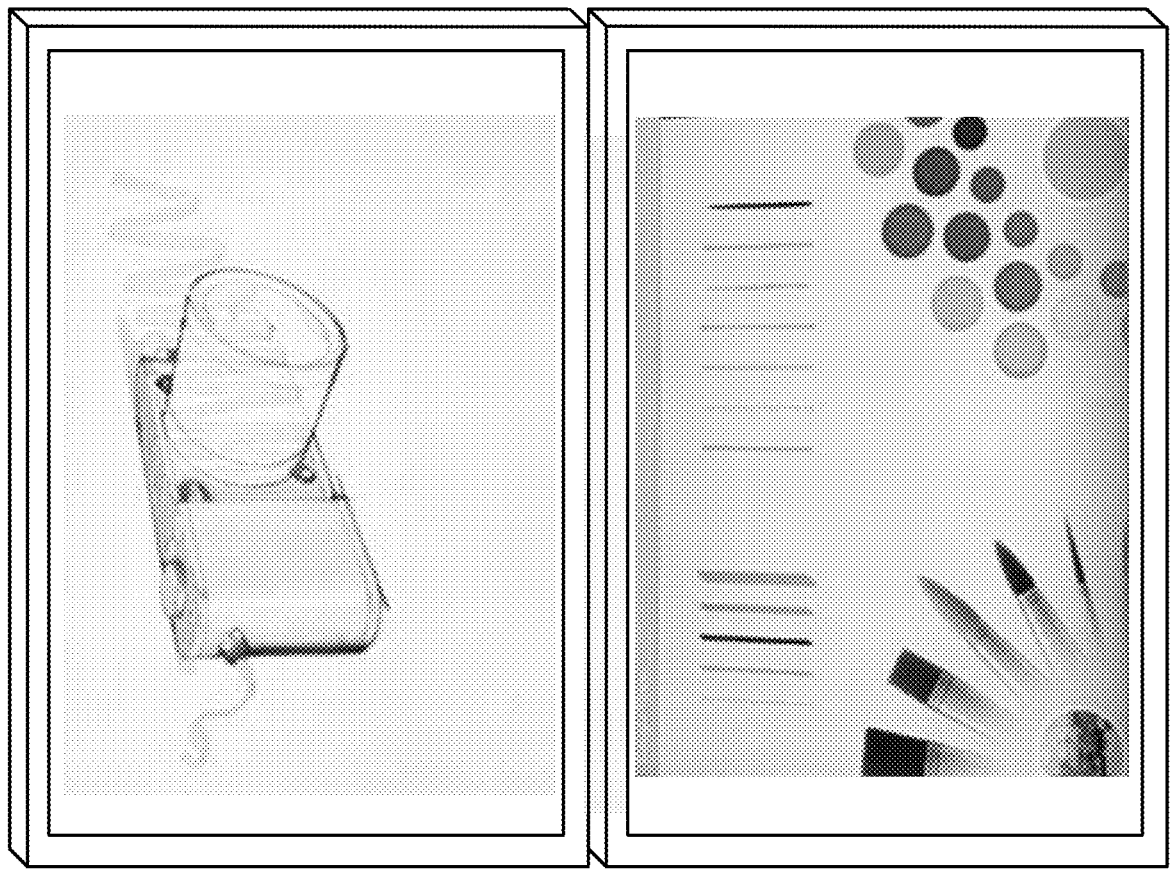
Figure 5E:
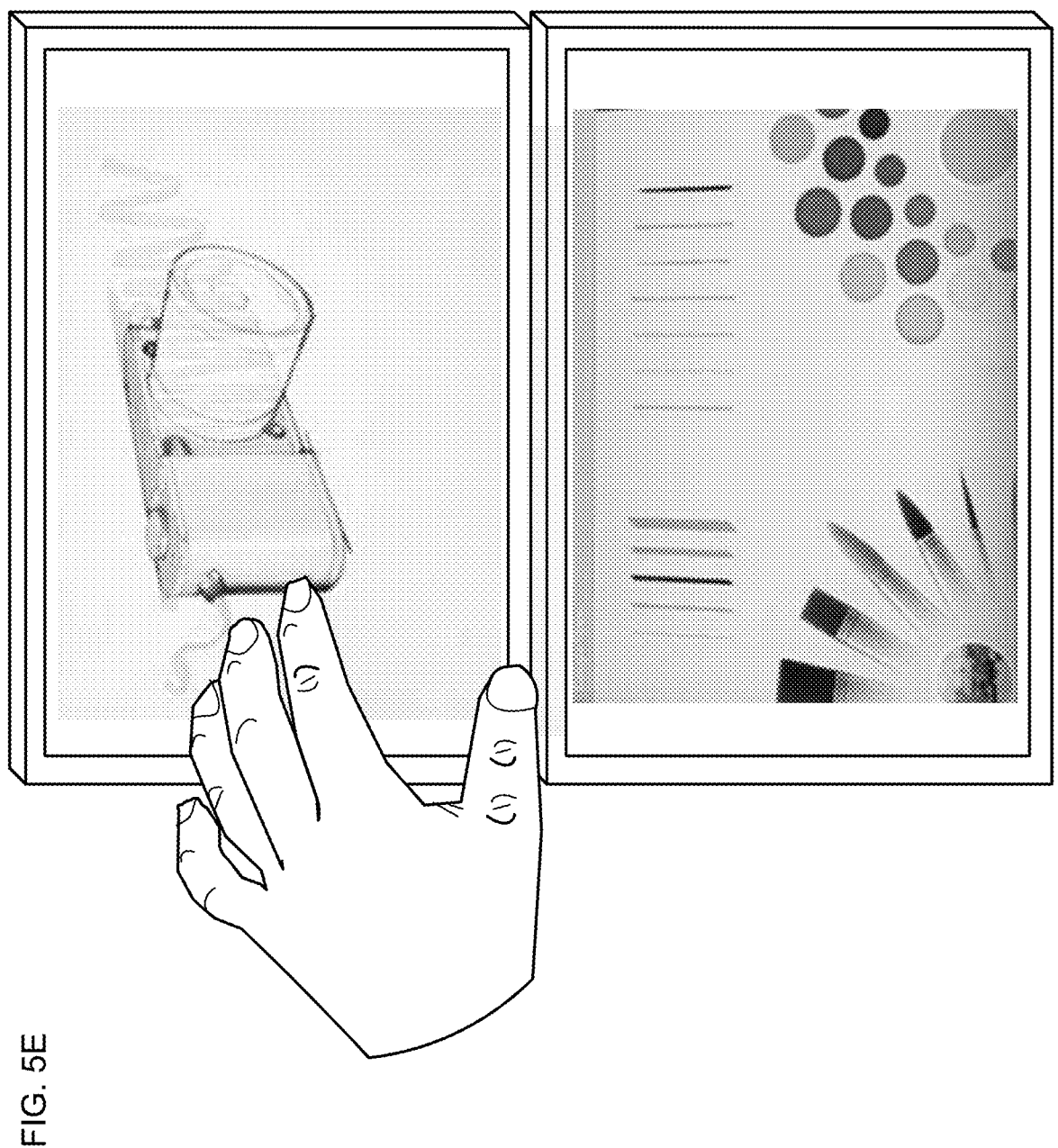

In order to enable easy operation of the application, selected content is presented in one of the two displays while interface elements are presented in the other display. An example of this is shown in FIG. 5C, where an image is presented in display 104*a* while a toolbar (e.g., color palate, brushes, line elements) are presented in display 104*b*, which may be closer to the user than display 104*a*. As shown in FIG. 5D, the user may flatten the upper screen so that both displays are flat and lie along the same plane. And as seen in FIG. 5E, the user may manipulate or modify the image presented in display 104*a* either by hand or using a tool such as a stylus on a touch-sensitive screen.

Figure 6A:
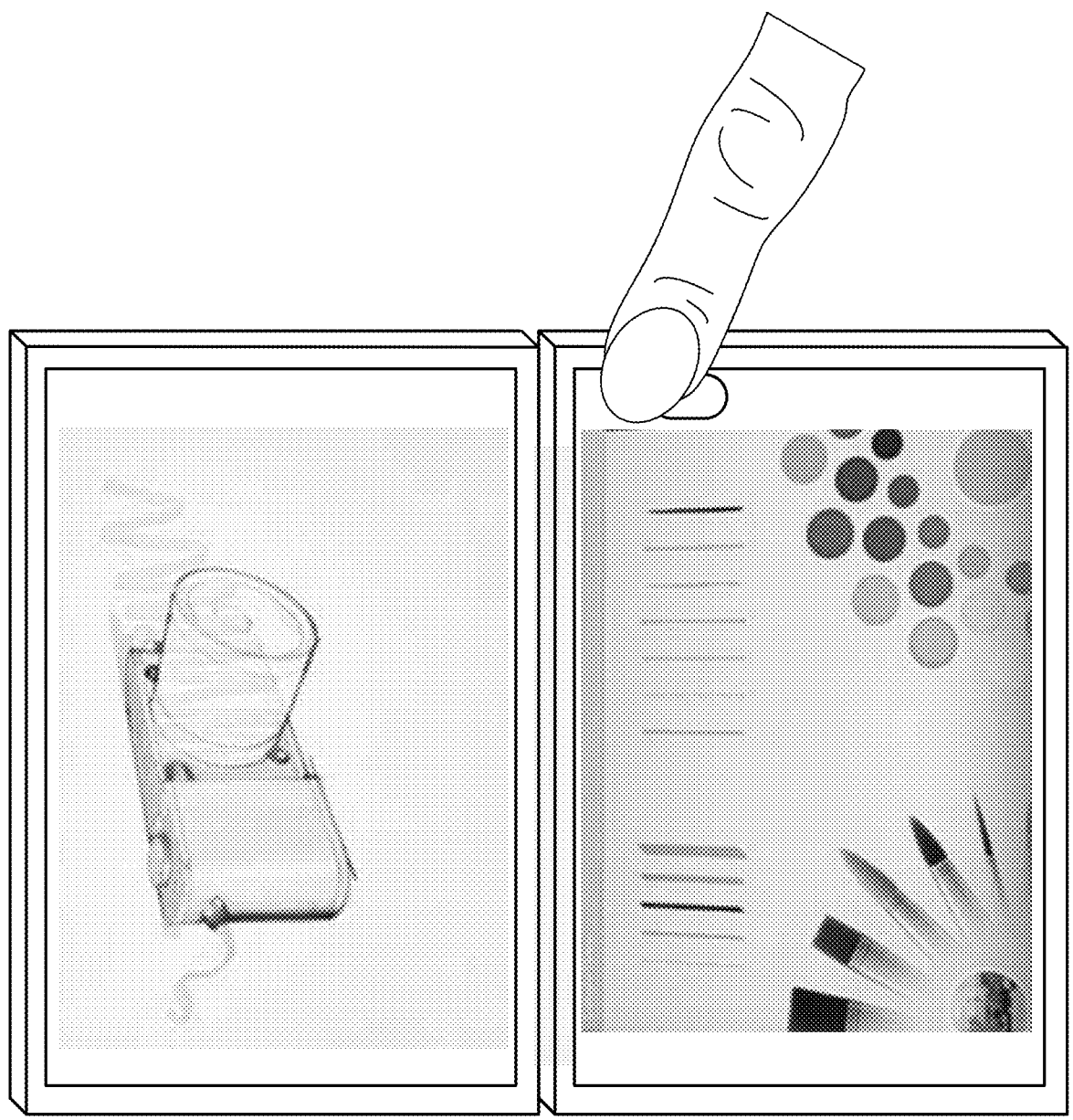
FIGS. 6A-D illustrate a first example of display screen content switching in accordance with an exemplary embodiment.
Figure 6B:
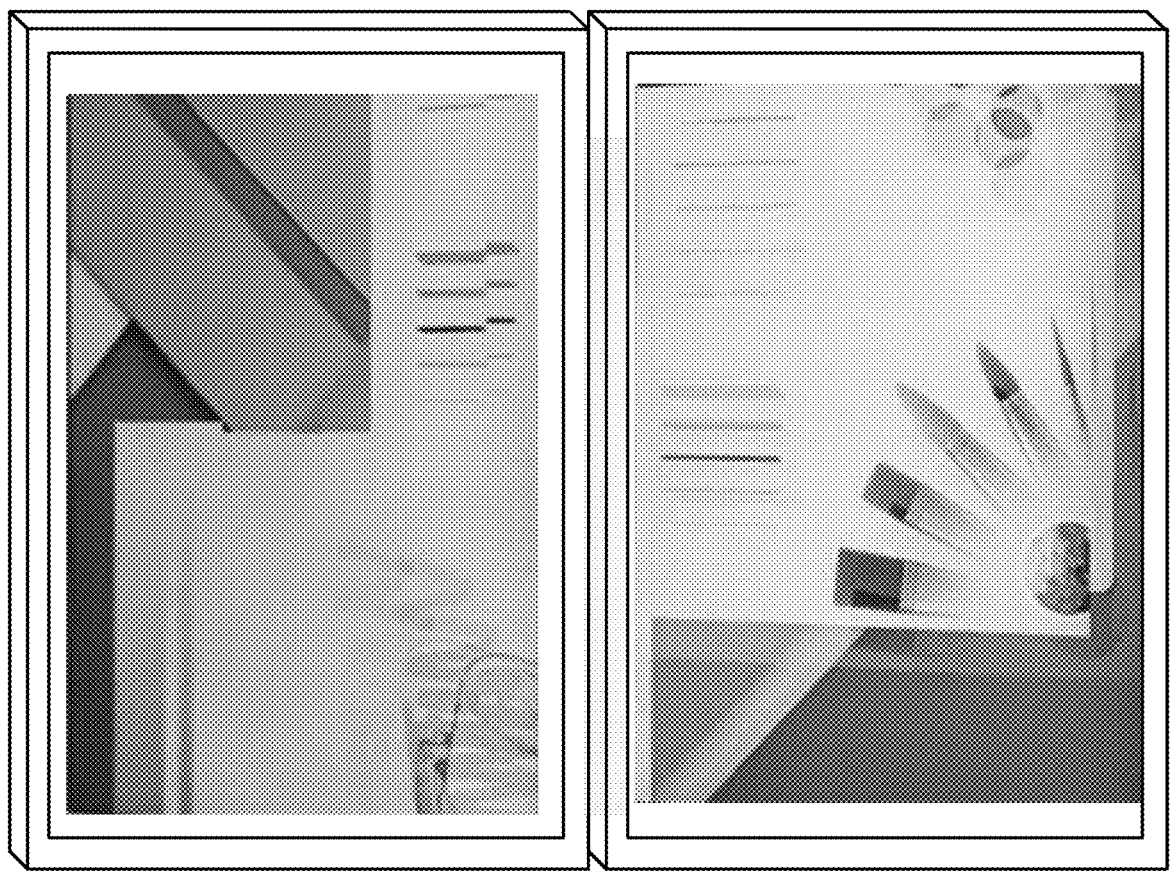
Figure 6C:
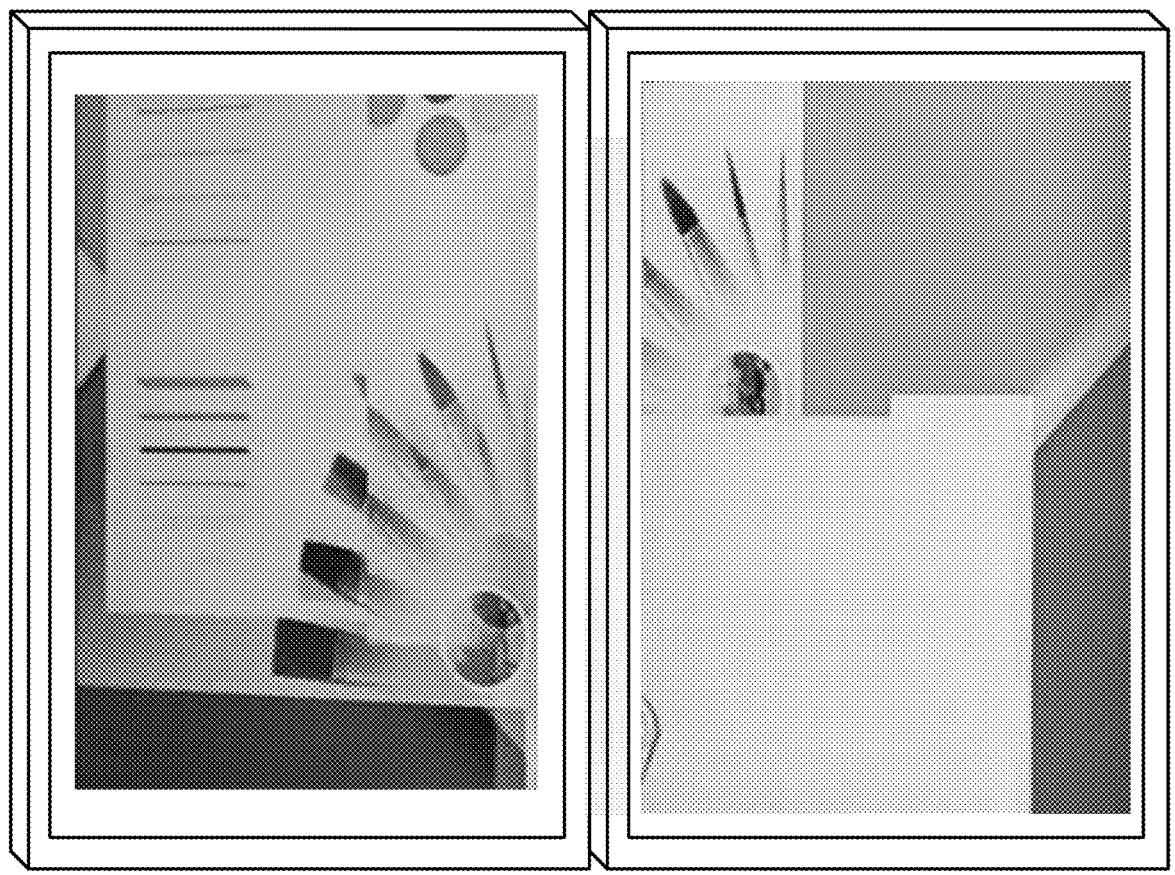
Figure 6D:
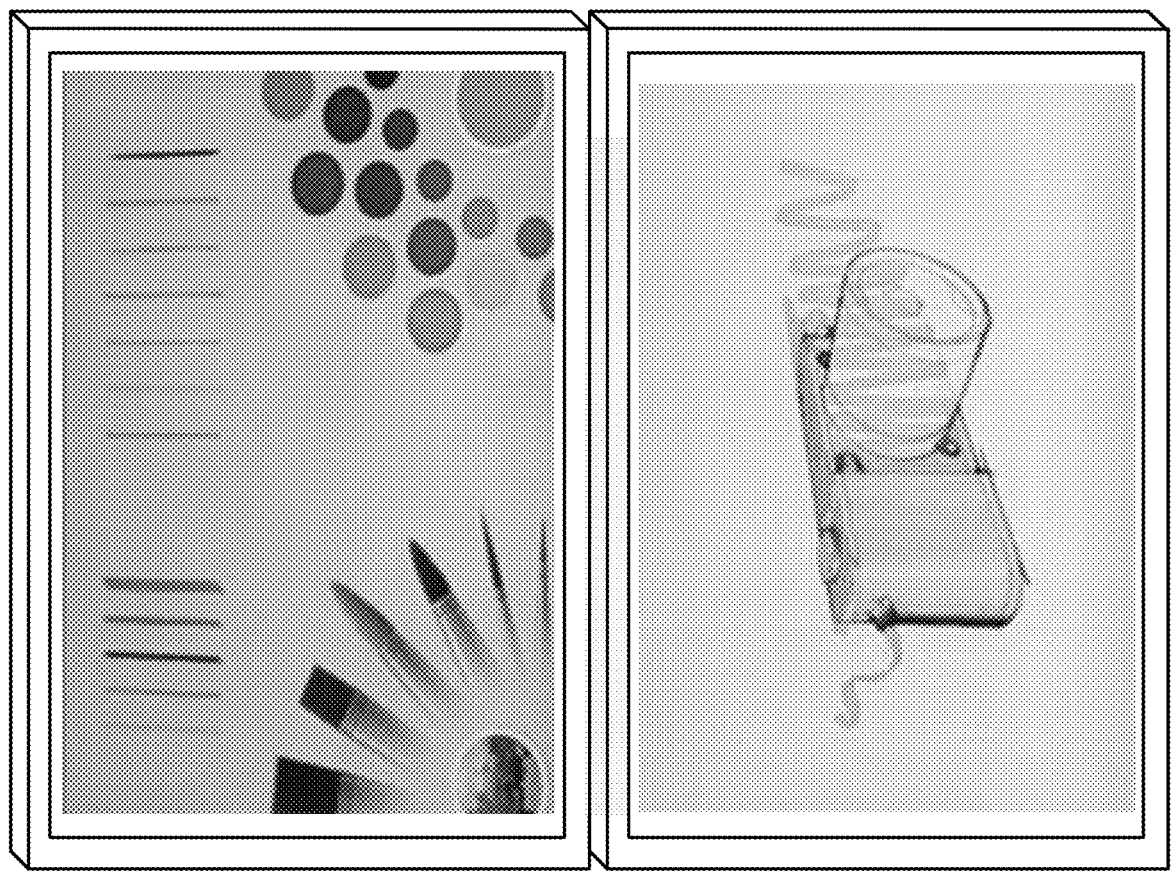

In accordance with another scenario, a first type of screen swapping 600 between the two display screens is illustrated in FIGS. 6A-6D. As shown in FIG. 6A, the user may instruct the client device to swap screens, for instance by pressing a button. This may be done via a "soft" button on one of the two display screens, or by pressing a physical button on one of the display housings. Alternatively, the physical button could be another actuator such as a switch, slider, etc., or could be done by voice activation or the like. In response to this instruction or signal, one or more of the processors, user interface module and display interfaces causes the content of the two display screens to be swapped. FIGS. 6B-6D illustrate an example of counterclockwise swapping, where the appearance of the change in content gives the impress of a counterclockwise rotation of the two screens. Alternatively, the swapping could be in a clockwise direction, via a carousel-type rotation, etc. The result in FIG. 6D is that the toolbar (e.g., color palate, brushes, line elements) is now presented in display 104*a*, while the image is presented in display 104*b* (which may be closer to the user than the display 4*a*).

Figure 7A:
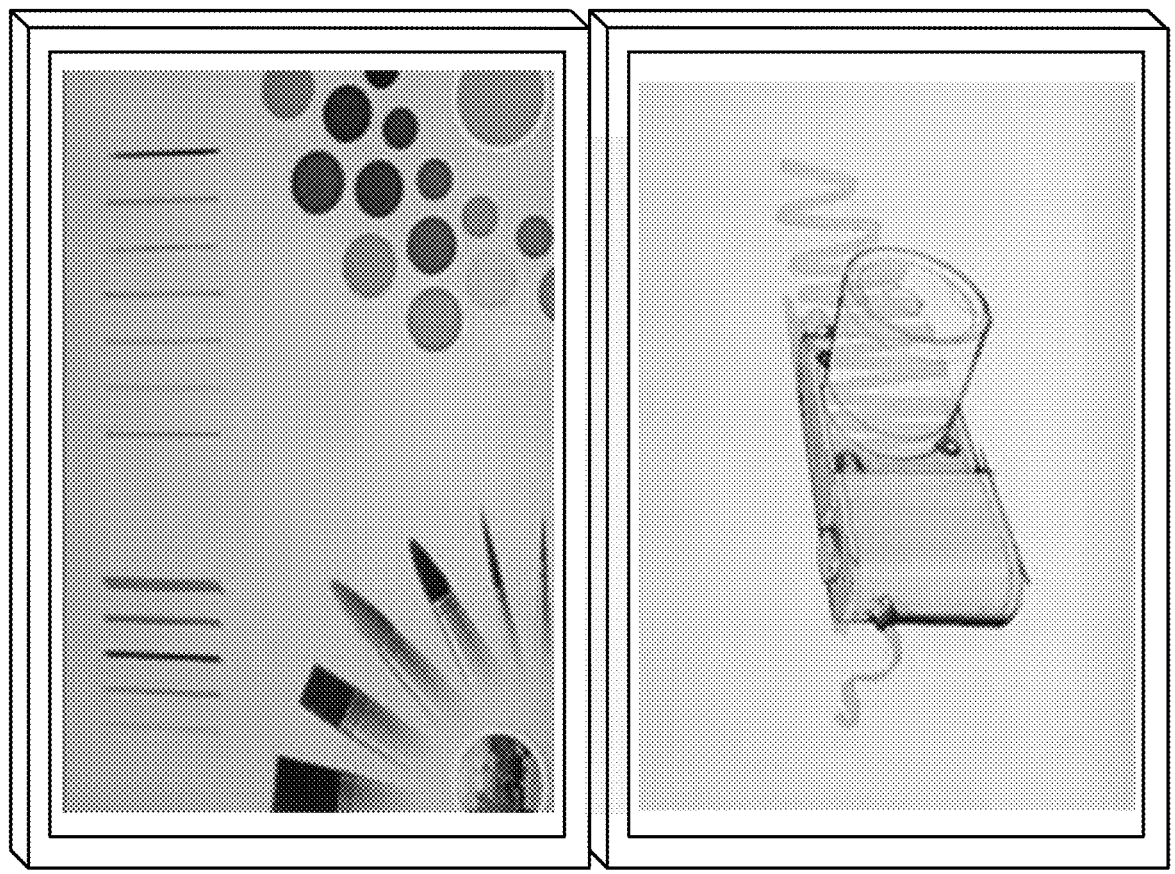
FIGS. 7A-G illustrate a second example of display screen content switching in accordance with an exemplary embodiment.
Figure 7B:
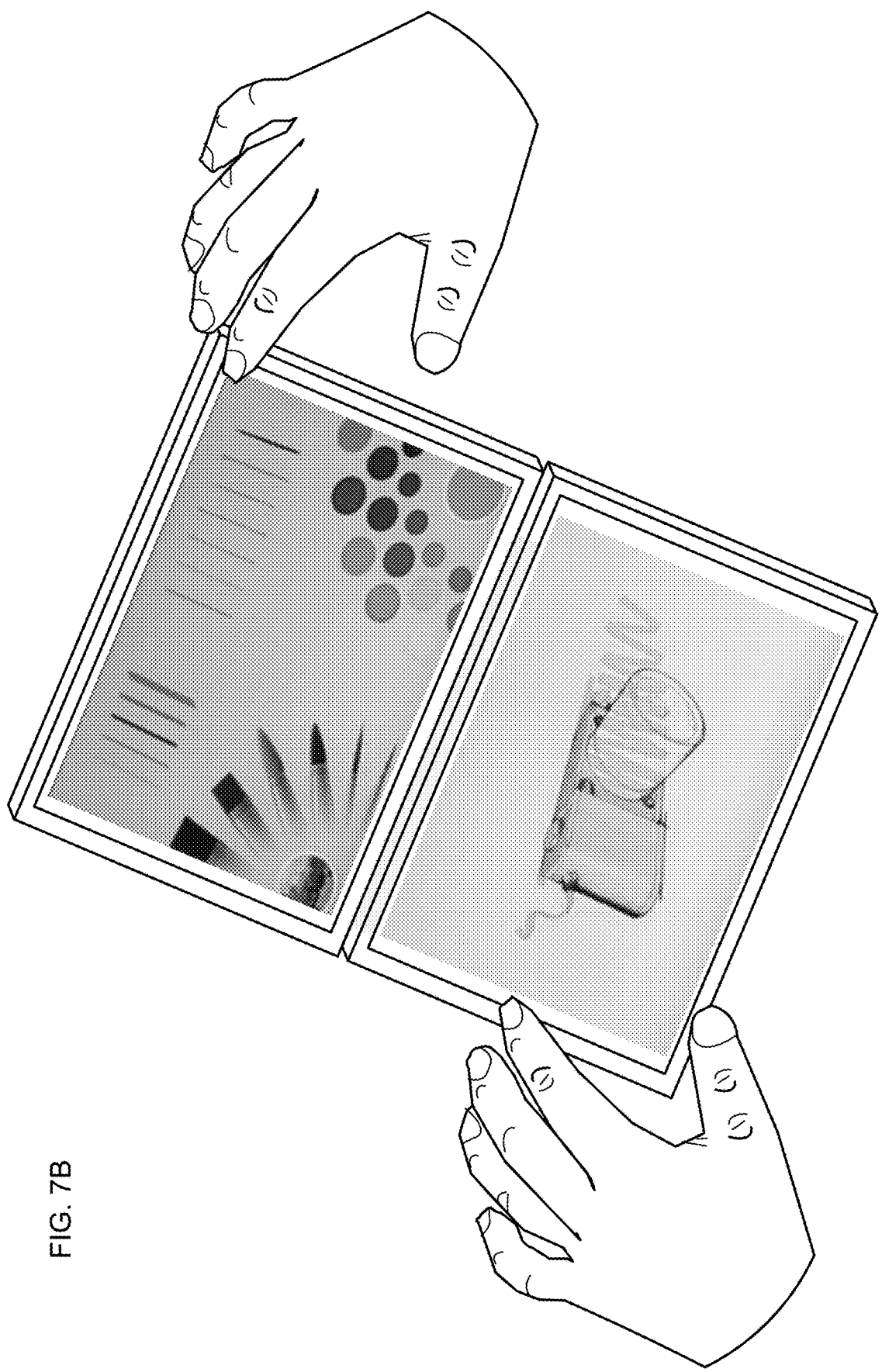
Figure 7C:
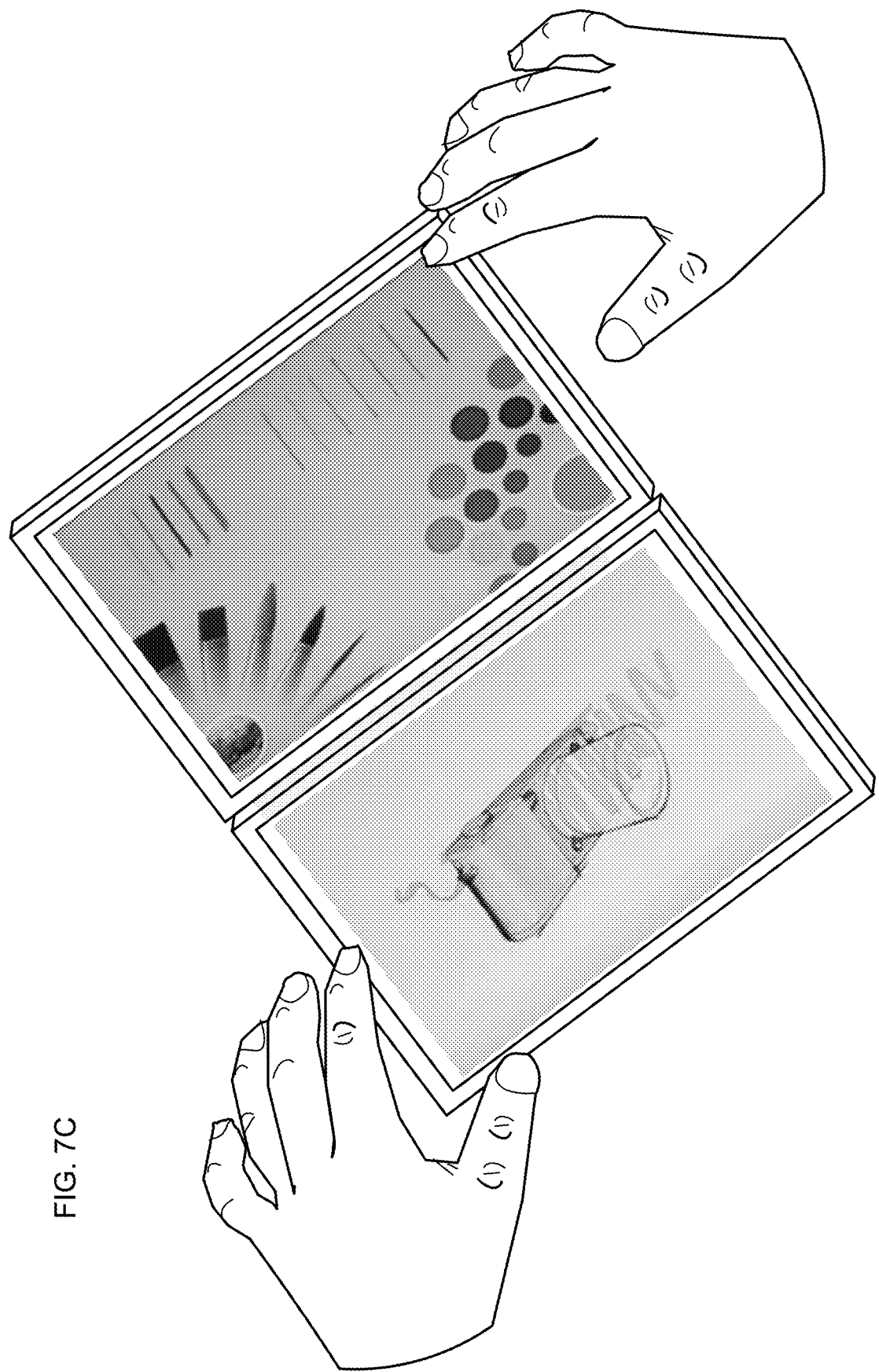
Figure 7D:
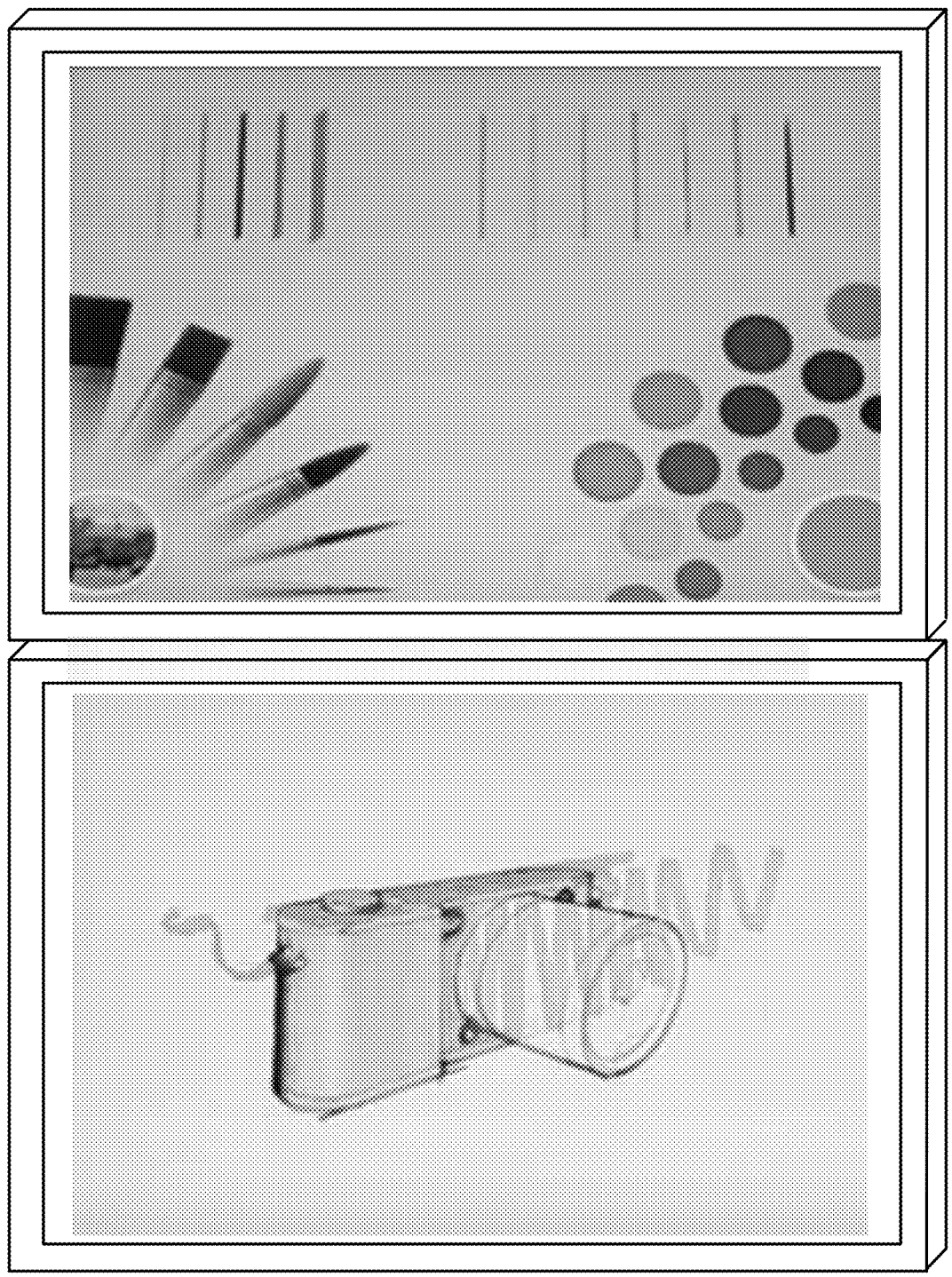
Figure 7E:
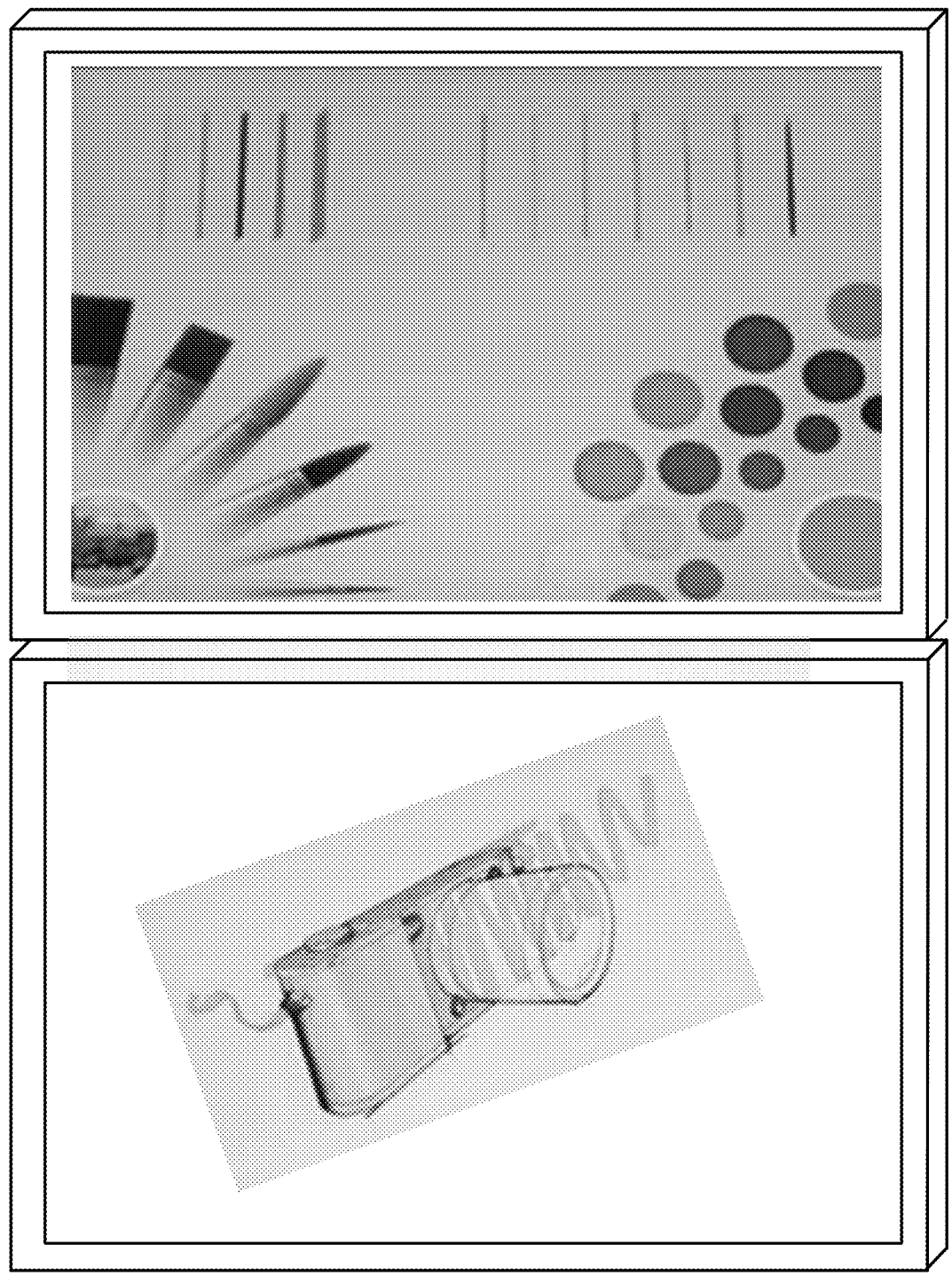
Figure 7F:
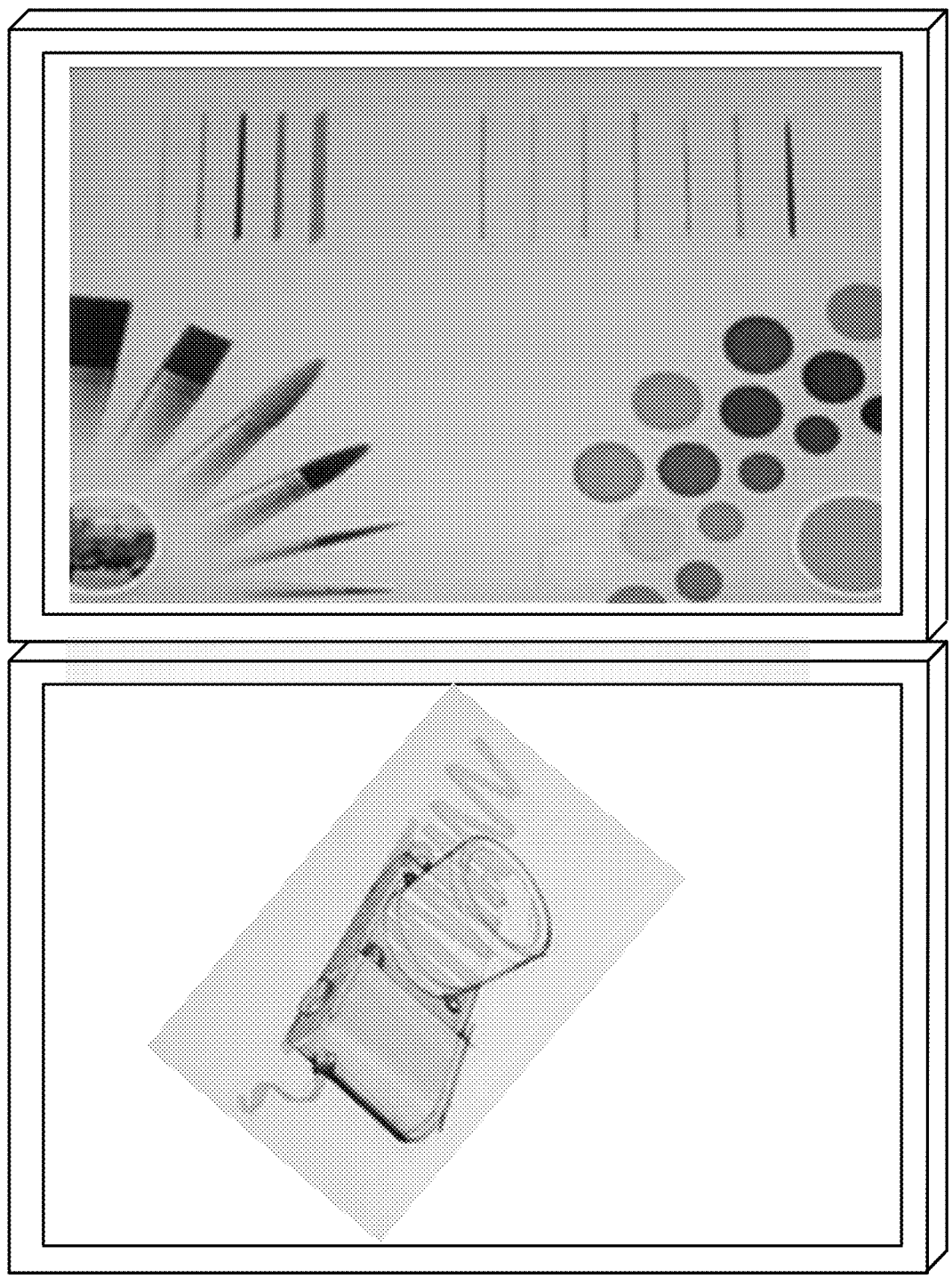
Figure 7G:
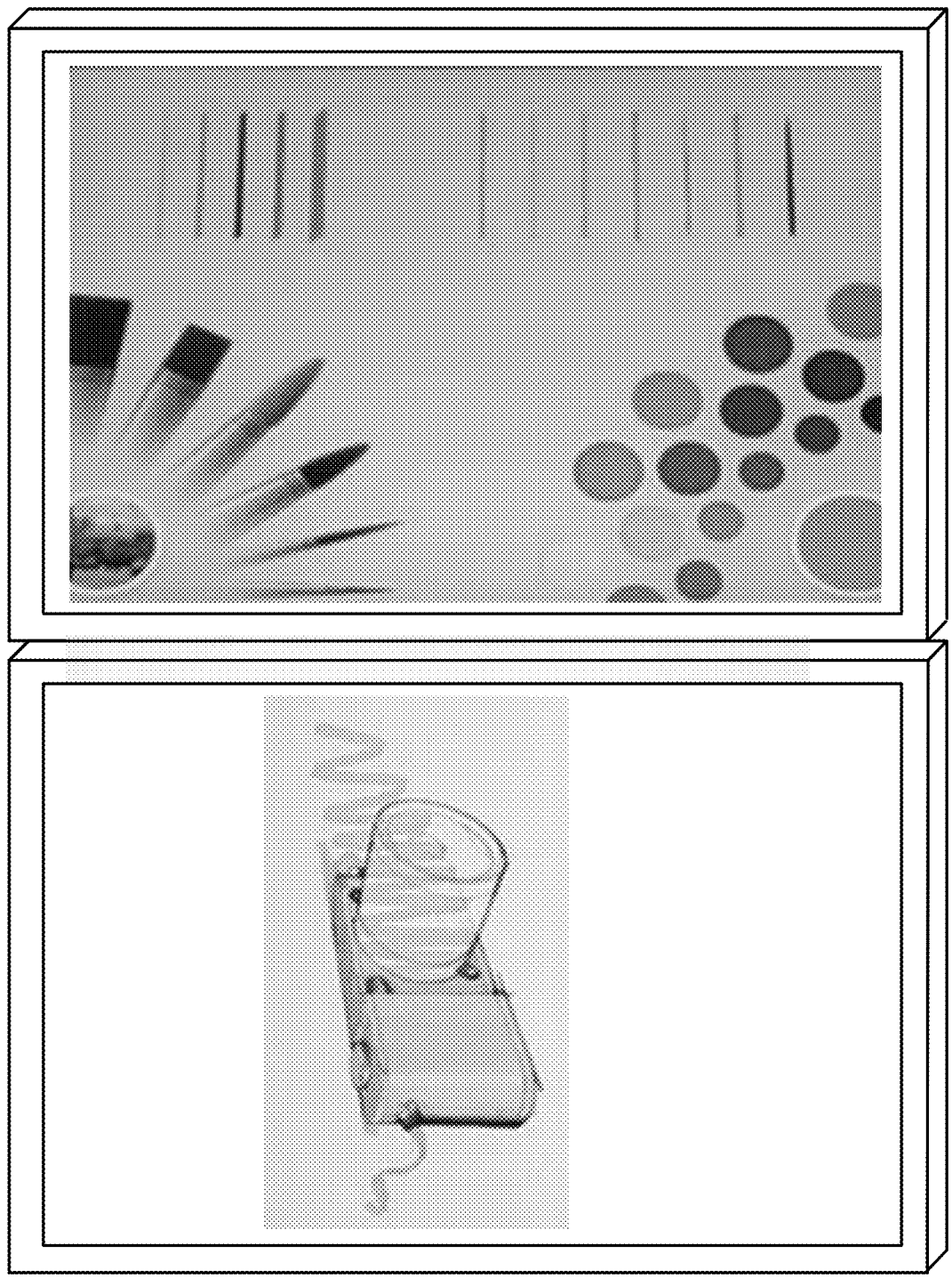

An example of physical display screen swapping is illustrated in scenario 700 of FIGS. 7A-7G. Here, the user physically rotates both display housings, e.g., in a clockwise or counterclockwise direction, as shown in FIGS. 7B-7D. The rotation may stop at, for instance, 90 degrees from the prior position, which places the two display housings side by side instead of one over the other. The position and/or orientation sensors 128 detect the instantaneous placement of each display housing, and thus the system can determine the particular arrangement of the display screens. Either during or after the rotation by the user, the processing system, e.g., one or more of the processors, user interface module and display interfaces, causes the content of one or both of the display screens to be swapped. This is shown in FIGS. 7E-7G. Here, in this example, only the content of interest (e.g., active content)—the camera drawing—is rotated in the left display screen by 90 degrees, or the same amount of rotation as the physical display housing was rotated. The editing tools of the application (e.g., control elements) may remain in place or may also be rotated. Alternatively, the display screen including the user interface tools may rotate while the content of interest remains unrotated.

Figure 8A:
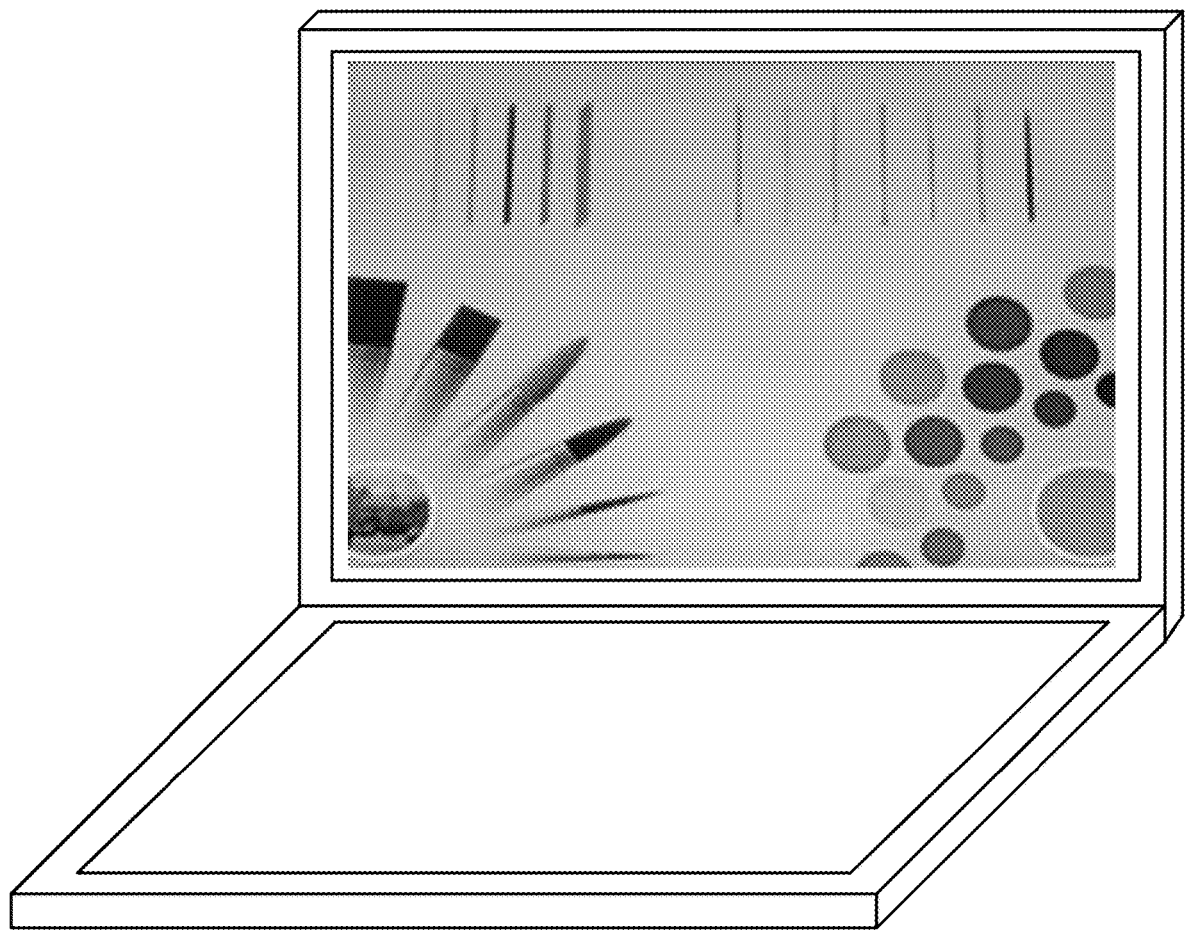
FIGS. 8A-B illustrate operation of a dual screen display device in accordance with an exemplary embodiment.
Figure 8B:
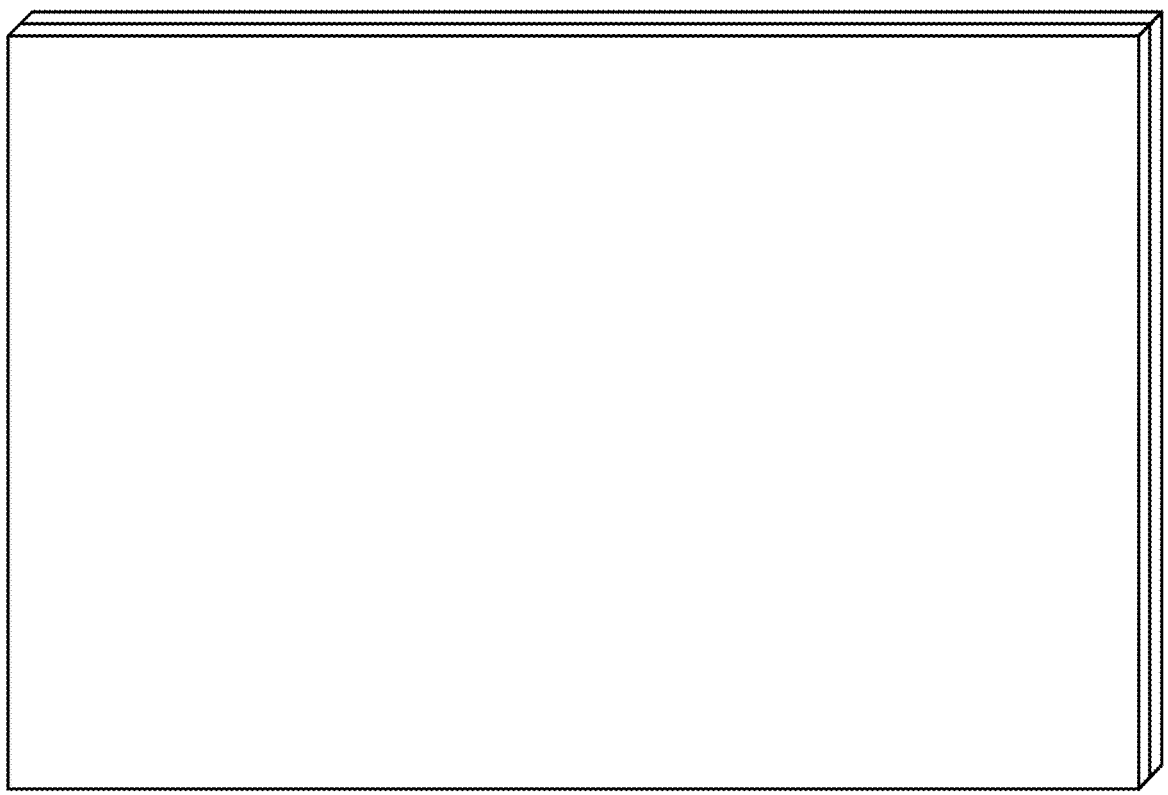

When the user is done with the application or wants to power down or shut off the client device, he or she can close it by folding one of the display housings on top of the other display housing as shown by embodiment 800 of FIGS. 8A-8B. The client device may be turned on, woken from sleep mode or otherwise activated by at least partly opening or separating the display housings from one another (not shown).

These various scenarios and examples show that, in accordance with certain embodiments, content of interest (e.g., selected content) is presented to the user in one display screen while application tools or other input elements (e.g., control elements) are presented to the user in the other display screen. Material including the selected content and the control elements is easily swapped between the two display screens, either by apparent rotation or movement of the presented material, or be detecting physical rotation or movement of the display housings.

FIG. 9 is an example flow diagram 900 in accordance with some of the aspects described above that may be performed by one or more processors, either alone or in conjunction with the user interface module, display interfaces and other components of the client device. In block 902, the process generates a first set of content items for presentation on a first display device of the multi-display computer system. In block 904, the process generates a second set of content items for presentation on a second display device of the multi-display computer system. Then in block 906, upon receiving input information, the process modifies at least one of the first and second sets of content items. And in block 908, the modified content items are presented on at least one of the first and second display devices, wherein presentation of the modified content includes swapping selected content between the first and second display devices. The first set of content, such as an image, video or other item of interest for a given application (e.g., selected content), may be swapped with tools for that application (e.g., control elements). This way, depending on what the user is doing, the process enables the dual-screen display system to provide the different types of content items (e.g., items of interest versus application tools) to a user on each display device in a readily usable manner. Swapping of the content can be initiated by the user by pressing a button or other actuator on either display housing, or by physically rotating the display housings.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer-implemented content presentation method for use in a multi-display computer system, the method comprising:
   generating, by one or more processors, a first set of content items for presentation on a first display device of the multi-display computer system, the first set of content items including a virtual keyboard and a virtual mousepad configured to receive input information from a user of the multi-display computer system;
   generating, by the one or more processors, a second set of content items for presentation on a second display device of the multi-display computer system;
   upon receiving the input information, the one or more processing devices modifying at least one of the first and second sets of content items, wherein the received input information indicates that orientations of both the first and second display devices have changed as detected by one or more position and orientation sensors of the multi-display computer system, the orientation change indicating a concurrent physical rotation of both the first and second display devices; and presenting the modified content items on at least one of the first and second display devices;

wherein modifying at least one of the first and second sets of content items comprises replacing at least one of the virtual keyboard or the virtual mousepad with an element of interest.

2. The method of claim 1, wherein at least one of the second sets of content items corresponds to one selected from the group consisting of:
   (i) a log-in interface;
   (ii) one or more applications;
   (iii) one or more widgets;
   (iv) thumbnail images;
   (v) audio content; and
   (vi) video content.

3. The method of claim 1, wherein the received input information identifies that:
   an input device of the multi-display computer system has been pressed; or
   either a portion of the virtual keyboard or virtual mousepad has been selected.

4. The method of claim 1, wherein the first set of content items are presented on the first display device and the second set of content items are presented on the second display device when the first display device is closer to the user than the second display device.

5. The method of claim 1, wherein the second set of content items includes active content being presented to the user in response to input received by the virtual keyboard or the virtual mousepad.

6. The method of claim 1, wherein the second set of content items comprises a web browser interface.

7. A multi-display client computing device, comprising:
   a first display housing including a first display device therein;
   a second display housing including a second display device therein;
   one or more position and orientation sensors operatively coupled to at least one of the first and second display housings;
   one or more processors operatively coupled to the first and second display devices and to the one or more position and orientation sensors, the one or more processors being configured to:
      generate a first set of content items for presentation on the first display device, the first set of content items including a virtual keyboard and a virtual mousepad configured to receive input information from a user of the multi-display computer system;
      generate a second set of content items for presentation on the second display device;
      upon receiving the input information from an input source, modify at least one of the first and second sets of content items, wherein the received input information indicates that orientations of both the first and second display housings have changed as detected by the one or more position and orientation sensors, the orientation change indicating a concurrent physical rotation of both the first and second display housings; and
      cause the modified content items to be presented on at least one of the first and second display devices;
      wherein modification of at least one of the first and second sets of content items comprises replacement of at least one of the virtual keyboard or the virtual mousepad with an element of interest.

8. The multi-display client computing device of claim 7, wherein:
   each of the first and second display devices includes a touch sensitive input; and
   the input source is the touch sensitive input of one of the first and second display devices.

9. The multi-display client computing device of claim 7, wherein upon detection of the concurrent physical rotation, the modified content is rotated in at least one of the first and second display devices.

10. A computer-implemented content presentation method for use in a multi-display computer system, the method comprising:
   preparing, by one or more processors, selected content for presentation on a first display device of the multi-display computer system;
   generating, by the one or more processors, one or more control elements for presentation on a second display device of the multi-display computer system, the control elements including a virtual keyboard and a virtual mousepad operatively associated with the selected content to enable manipulation or modification of the selected content in response to an input signal;
   detecting a concurrent rotation of both the first and second display devices of the multi-display computer system;
   in response to detecting the concurrent rotation, swapping presentation of the selected content from the first display device to the second display device, and swapping presentation of the control elements from the second display device to the first display device; and
   performing, by the one or more processors, an authentication operation using at least one of the virtual keyboard and the virtual mousepad.

11. The method of claim 10, wherein:
   the selected content comprises a log-in interface; and
   the authentication operation comprises logging in a user via the log-in interface.

12. The method of claim 10, wherein, upon logging in the user, at least one of the virtual keyboard and the virtual mousepad are replaced by one or more elements of interest.

13. The method of claim 12, wherein the one or more elements of interest are associated with one or more menu components of a program or application.

14. The method of claim 12, wherein replacement of the virtual keyboard or virtual mousepad comprises the virtual keyboard or virtual mousepad fading away from the second display device.

15. A computer-implemented content presentation method for use in a multi-display computer system, the method comprising:
   generating, by one or more processors, a first set of content items for presentation on a first display device of the multi-display computer system, the first set of content items including a virtual keyboard and a virtual mousepad configured to receive input information from a user of the multi-display computer system;
   generating, by the one or more processors, a second set of content items for presentation on a second display device of the multi-display computer system;
   upon receiving the input information, the one or more processing devices modifying at least one of the first and second sets of content items, wherein the received input information indicates that orientations of both the first and second display devices have changed as detected by one or more position and orientation sensors of the multi-display computer system, the orientation change indicating a concurrent physical rotation of both the first and second display devices; and presenting the modified content items on at least one of the first and second display devices;

wherein:

the second set of content items corresponds to a log-in interface, the log-in interface being associated with a program or application; and in response to receipt of account authentication information, at least one of the virtual keyboard and the virtual mousepad are replaced by one or more elements of interest.

16. The method of claim 15, wherein the one or more elements of interest are associated with one or more menu components of the program or application.

17. The method of claim 15, wherein replacement of the virtual keyboard or virtual mousepad comprises the virtual keyboard or virtual mousepad fading away from the first display device.

* * * * *

UNITED STATES PATENT AND TRADEMARK OFFICE
CERTIFICATE OF CORRECTION

PATENT NO. : 11,335,302 B2
APPLICATION NO. : 14/996346
DATED : May 17, 2022
INVENTOR(S) : Bernardo Núñez Rojas It is certified that error appears in the above-identified patent and that said Letters Patent is hereby corrected as shown below:

In the Claims

Column 8, Claim 1, Line 64:
Now reads: "processing devices"; should read -- processors --

Column 9, Claim 7, Line 54:
Now reads: "computer system"; should read -- client computing device --

Column 10, Claim 12, Line 42:
Now reads: "logging in the"; should read -- logging in a --

Column 10, Claim 15, Line 65:
Now reads: "processing devices"; should read -- processors --

Signed and Sealed this
Twenty-fifth Day of June, 2024

Katherine Kelly Vidal
*Director of the United States Patent and Trademark Office*